United States Patent
Lee et al.

(10) Patent No.: US 11,895,691 B2
(45) Date of Patent: Feb. 6, 2024

(54) METHOD AND APPARATUS FOR TRANSMITTING, TO BASE STATION, INFORMATION ASSOCIATED WITH SIDELINK ON BASIS OF BWP IN NR V2X

(71) Applicant: LG Electronics Inc., Seoul (KR)

(72) Inventors: Seungmin Lee, Seoul (KR); Hanbyul Seo, Seoul (KR); Daesung Hwang, Seoul (KR)

(73) Assignee: LG Electronics Inc., Seoul (KR)

(*) Notice: Subject to any disclaimer, the term of this patent is extended or adjusted under 35 U.S.C. 154(b) by 220 days.

(21) Appl. No.: 17/635,950

(22) PCT Filed: Aug. 18, 2020

(86) PCT No.: PCT/KR2020/010975
§ 371 (c)(1),
(2) Date: Feb. 16, 2022

(87) PCT Pub. No.: WO2021/034079
PCT Pub. Date: Feb. 25, 2021

(65) Prior Publication Data
US 2022/0295504 A1    Sep. 15, 2022

Related U.S. Application Data

(60) Provisional application No. 62/891,937, filed on Aug. 26, 2019, provisional application No. 62/888,411, filed on Aug. 16, 2019.

(51) Int. Cl.
*H04W 72/10* (2009.01)
*H04L 1/18* (2023.01)
(Continued)

(52) U.S. Cl.
CPC .......... *H04W 72/56* (2023.01); *H04L 1/1812* (2013.01); *H04L 5/0053* (2013.01); *H04W 72/02* (2013.01); *H04W 72/044* (2013.01); *H04W 72/20* (2023.01)

(58) Field of Classification Search
CPC ... H04L 1/1812; H04L 1/1854; H04L 5/0053; H04L 1/1887; H04L 2001/0092;
(Continued)

(56) References Cited

U.S. PATENT DOCUMENTS

2018/0279275 A1    9/2018  Chen et al.
2021/0105126 A1*   4/2021  Yi ................... H04L 1/1671
(Continued)

FOREIGN PATENT DOCUMENTS

WO    WO 2021/007862    1/2021

OTHER PUBLICATIONS

Huawei, HiSilicon, "Sidelink physical layer procedures for NR V2X," 3GPP TSG RAN WG1 Meeting # 97, R1-1906008, Reno, USA, May 13-17, 2019, 24 pages.
(Continued)

*Primary Examiner* — Maharishi V Khirodhar
*Assistant Examiner* — Kenneth P Hunt
(74) *Attorney, Agent, or Firm* — Fish & Richardson P.C.

(57) ABSTRACT

Provided are a method for performing wireless communication by a first apparatus, and an apparatus for supporting same. The method may comprise the steps of: receiving, from a first base station, information associated with a sidelink (SL) bandwidth part (BWP); receiving, from the first base station, information associated with an uplink (UL) BWP; receiving, from the first base station, information associated with a first SL resource and information associated with a first UL resource for reporting hybrid automatic repeat request (HARQ) feedback; determining not to per-
(Continued)

form SL transmission on the basis of the first SL resource on the SL BWP; and on the basis of determining, by the first apparatus, not to perform the SL transmission on the basis of the first SL resource, transmitting, to the first base station, HARQ NACK on the basis of the first UL resource on the UL BWP.

13 Claims, 34 Drawing Sheets

(51) Int. Cl.
  *H04L 5/00*    (2006.01)
  *H04W 72/02*    (2009.01)
  *H04W 72/04*    (2023.01)
  *H04W 72/56*    (2023.01)
  *H04L 1/1812*    (2023.01)
  *H04W 72/044*    (2023.01)
  *H04W 72/20*    (2023.01)

(58) Field of Classification Search
  CPC . H04W 72/569; H04W 72/02; H04W 72/044; H04W 72/56; H04W 72/20; H04W 4/40; H04W 72/0453
  See application file for complete search history.

(56) References Cited

U.S. PATENT DOCUMENTS

2021/0377989 A1* 12/2021 Chae .................. H04B 7/06954
2022/0304001 A1* 9/2022 Lee .................. H04W 72/0446

OTHER PUBLICATIONS

Notice of Allowance in Japanese Appln. No. 2022-509710, dated Jun. 30, 2023, 5 pages (with English translation).
Office Action in Japanese Appln. No. 2022-509710, dated Feb. 28, 2023, 8 pages (with English translation).
CATT, "Prioritization of Uu and SL for NR V2X," R2-1905803, Presented at 3GPP TSG-RAN WG2 Meeting #106, Reno, USA, May 13-17, 2019, 6 pages.
CATT, "Prioritization of Uu and SL for NR V2X," R2-195803, Presented at 3GPP TSG-RAN WG2 Meeting #106, Reno, USA, May 13-17, 2019, 6 pages.
Huawei, HiSilicon, "Sidelink physical layer procedures for NR V2X," R1-1906008, Presented at 3GPP TSG RAN WG1 Meeting #97, Reno, USA, May 13-17, 2019, 23 pages.
Huawei, HiSilicon, "Sidelink physical layer structure for NR V2X," R1-1906007, Presented at 3GPP TSG RAN WG1 Meeting #97, Reno, USA, May 13-17, 2019, 18 pages.
OPPO, "Left issues on MAC for NR-V2X," R2-1905568, Presented at 3GPP TSG-RAN WG2 Meeting #106, Reno, US, 13 May 13-May 17, 2019, 6 pages.

* cited by examiner

FIG. 10
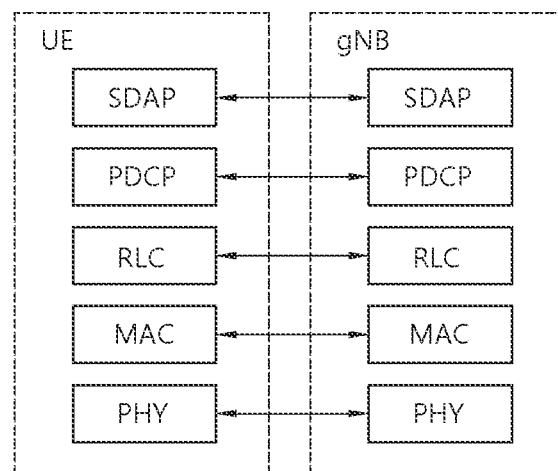
(a)
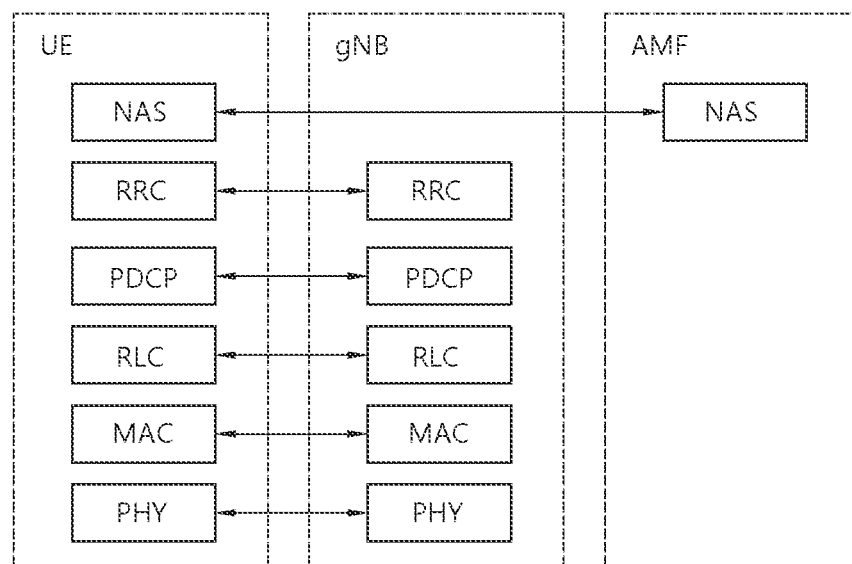
(b)

FIG. 14
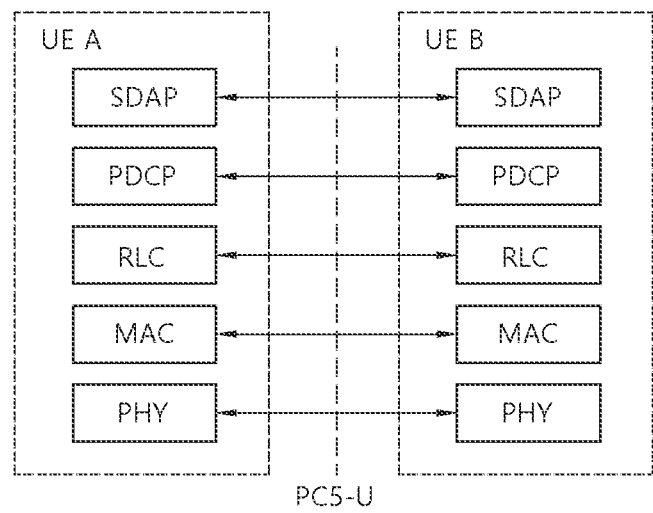
(a)
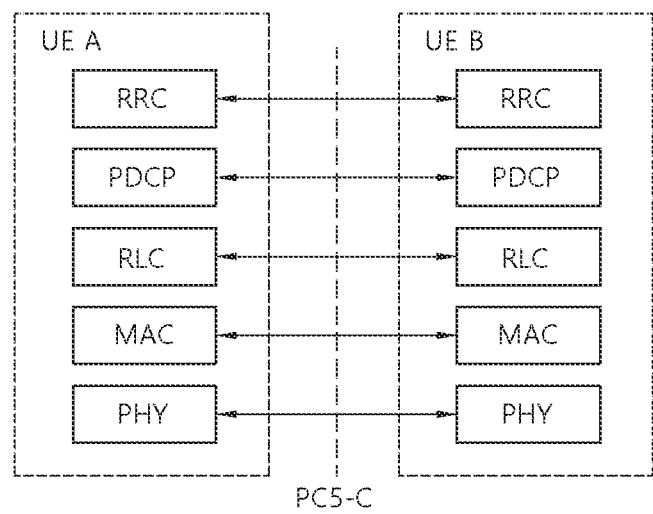
(b)

FIG. 22 receive, from first device, sidelink control information including information on second resource on first resource ~S2210

FIG. 28 receive, from first device, information related
to sidelink transmission on second resource — S2810

METHOD AND APPARATUS FOR TRANSMITTING, TO BASE STATION, INFORMATION ASSOCIATED WITH SIDELINK ON BASIS OF BWP IN NR V2X

CROSS-REFERENCE TO RELATED APPLICATIONS

This application is a National Stage application under 35 U.S.C. § 371 of International Application No. PCT/KR2020/010975, filed on Aug. 18, 2020, which claims the benefit of U.S. Provisional Application No. 62/888,411, filed on Aug. 16, 2019 and U.S. Provisional Application No. 62/891,937, filed on Aug. 26, 2019. The disclosures of the prior applications are incorporated by reference in their entirety.

BACKGROUND OF THE DISCLOSURE

Field of the Disclosure

This disclosure relates to a wireless communication system.

Related Art

Sidelink (SL) communication is a communication scheme in which a direct link is established between User Equipments (UEs) and the UEs exchange voice and data directly with each other without intervention of an evolved Node B (eNB). SL communication is under consideration as a solution to the overhead of an eNB caused by rapidly increasing data traffic.

Vehicle-to-everything (V2X) refers to a communication technology through which a vehicle exchanges information with another vehicle, a pedestrian, an object having an infrastructure (or infra) established therein, and so on. The V2X may be divided into 4 types, such as vehicle-to-vehicle (V2V), vehicle-to-infrastructure (V2I), vehicle-to-network (V2N), and vehicle-to-pedestrian (V2P). The V2X communication may be provided via a PC5 interface and/or Uu interface.

Meanwhile, as a wider range of communication devices require larger communication capacities, the need for mobile broadband communication that is more enhanced than the existing Radio Access Technology (RAT) is rising. Accordingly, discussions are made on services and user equipment (UE) that are sensitive to reliability and latency. And, a next generation radio access technology that is based on the enhanced mobile broadband communication, massive Machine Type Communication (MTC), Ultra-Reliable and Low Latency Communication (URLLC), and so on, may be referred to as a new radio access technology (RAT) or new radio (NR). Herein, the NR may also support vehicle-to-everything (V2X) communication.

FIG. 1 is a drawing for describing V2X communication based on NR, compared to V2X communication based on RAT used before NR. The embodiment of FIG. 1 may be combined with various embodiments of the present disclosure.

Regarding V2X communication, a scheme of providing a safety service, based on a V2X message such as Basic Safety Message (BSM), Cooperative Awareness Message (CAM), and Decentralized Environmental Notification Message (DENM) is focused in the discussion on the RAT used before the NR. The V2X message may include position information, dynamic information, attribute information, or the like. For example, a UE may transmit a periodic message type CAM and/or an event triggered message type DENM to another UE.

For example, the CAM may include dynamic state information of the vehicle such as direction and speed, static data of the vehicle such as a size, and basic vehicle information such as an exterior illumination state, route details, or the like. For example, the UE may broadcast the CAM, and latency of the CAM may be less than 100 ms. For example, the UE may generate the DENM and transmit it to another UE in an unexpected situation such as a vehicle breakdown, accident, or the like. For example, all vehicles within a transmission range of the UE may receive the CAM and/or the DENM. In this case, the DENM may have a higher priority than the CAM.

Thereafter, regarding V2X communication, various V2X scenarios are proposed in NR. For example, the various V2X scenarios may include vehicle platooning, advanced driving, extended sensors, remote driving, or the like.

For example, based on the vehicle platooning, vehicles may move together by dynamically forming a group. For example, in order to perform platoon operations based on the vehicle platooning, the vehicles belonging to the group may receive periodic data from a leading vehicle. For example, the vehicles belonging to the group may decrease or increase an interval between the vehicles by using the periodic data.

For example, based on the advanced driving, the vehicle may be semi-automated or fully automated. For example, each vehicle may adjust trajectories or maneuvers, based on data obtained from a local sensor of a proximity vehicle and/or a proximity logical entity. In addition, for example, each vehicle may share driving intention with proximity vehicles.

For example, based on the extended sensors, raw data, processed data, or live video data obtained through the local sensors may be exchanged between a vehicle, a logical entity, a UE of pedestrians, and/or a V2X application server. Therefore, for example, the vehicle may recognize a more improved environment than an environment in which a self-sensor is used for detection.

For example, based on the remote driving, for a person who cannot drive or a remote vehicle in a dangerous environment, a remote driver or a V2X application may operate or control the remote vehicle. For example, if a route is predictable such as public transportation, cloud computing based driving may be used for the operation or control of the remote vehicle. In addition, for example, an access for a cloud-based back-end service platform may be considered for the remote driving.

Meanwhile, a scheme of specifying service requirements for various V2X scenarios such as vehicle platooning, advanced driving, extended sensors, remote driving, or the like is discussed in NR-based V2X communication.

SUMMARY OF THE DISCLOSURE

Technical Objects

Meanwhile, in the case of LTE sidelink mode 1 or mode 3 operation, or in the case of NR sidelink mode 1 operation in which a base station allocates sidelink transmission resource(s) to UE(s), it may be necessary for a transmitting UE to report information on received HARQ feedback, in order for the base station to efficiently manage sidelink resource(s). Herein, in case the UE drops SL transmission, since a base station does not know (accurately) whether the UE has determined not to perform SL transmission, the base station cannot allocate additional transmission resource(s) to the UE. Therefore, the UE needs to report information related to SL transmission to the base station.

Technical Solutions

In one embodiment, a method for performing wireless communication by a first device is provided. The method may comprise: receiving, from a first base station, information related to a sidelink (SL) bandwidth part (BWP); receiving, from the first base station, information related to an uplink (UL) BWP; receiving, from the first base station, information related to a first SL resource and information related to a first UL resource for reporting hybrid automatic repeat request (HARQ) feedback; determining not to perform SL transmission based on the first SL resource on the SL BWP; and transmitting, to the first base station, HARQ NACK based on the first UL resource on the UL BWP, based on the first device determining not to perform the SL transmission based on the first SL resource.

In one embodiment, a first device configured to perform wireless communication is provided. The first device may comprise: one or more memories storing instructions; one or more transceivers; and one or more processors connected to the one or more memories and the one or more transceivers. For example, the one or more processors may execute the instructions to: receive, from a first base station, information related to a sidelink (SL) bandwidth part (BWP); receive, from the first base station, information related to an uplink (UL) BWP; receive, from the first base station, information related to a first SL resource and information related to a first UL resource for reporting hybrid automatic repeat request (HARQ) feedback; determine not to perform SL transmission based on the first SL resource on the SL BWP; and transmit, to the first base station, HARQ NACK based on the first UL resource on the UL BWP, based on the first device determining not to perform the SL transmission based on the first SL resource.

Effects of the Disclosure

The user equipment (UE) may efficiently perform SL communication.

BRIEF DESCRIPTION OF THE DRAWINGS

FIG. 10 shows a radio protocol architecture, based on an embodiment of the present disclosure.

FIG. 14 shows a radio protocol architecture for a SL communication, based on an embodiment of the present disclosure.

FIG. 22 shows a method for a second device to receive sidelink information, based on an embodiment of the present disclosure.

FIG. 28 shows a method for a base station to receive information related to sidelink information from a first device on a second resource, based on an embodiment of the present disclosure.

DESCRIPTION OF EXEMPLARY EMBODIMENTS

Figure 1:
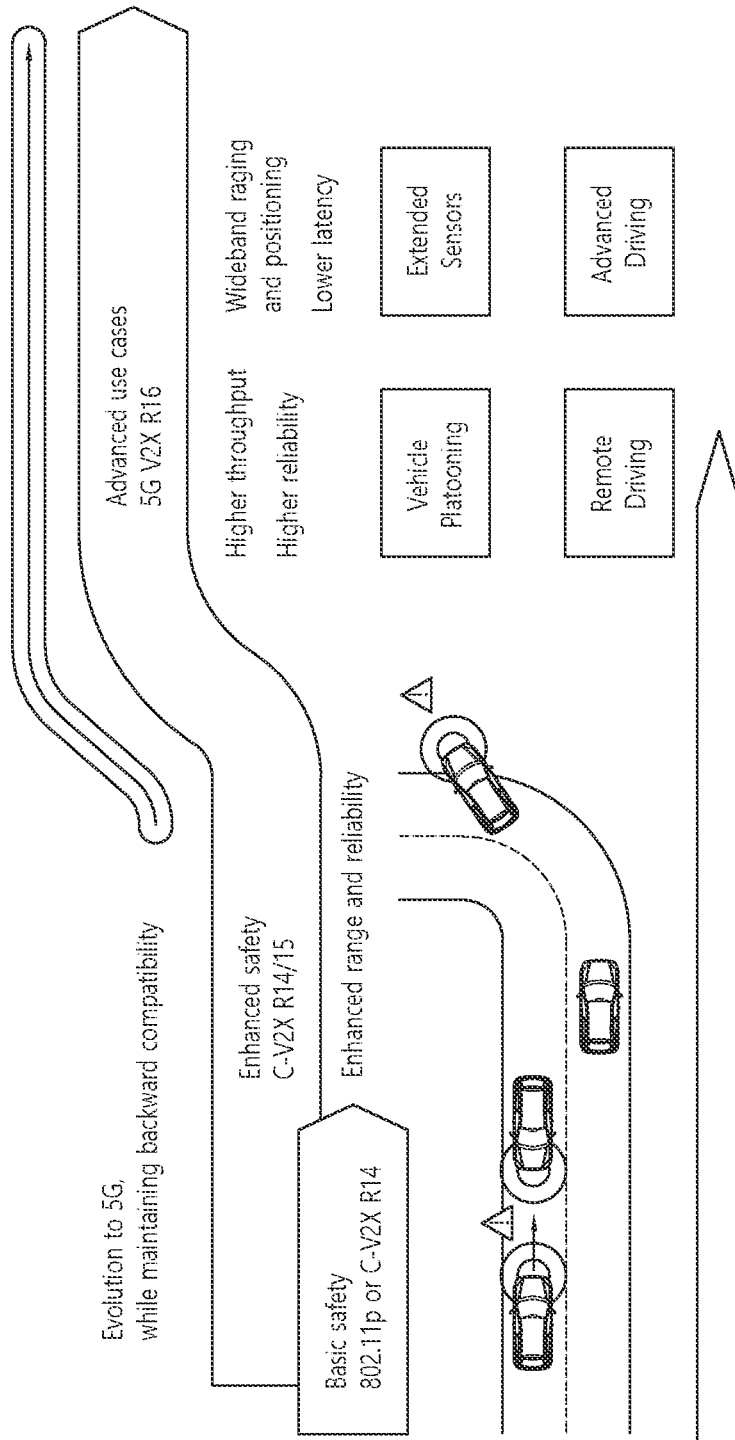
FIG. 1 is a drawing for describing V2X communication based on NR, compared to V2X communication based on RAT used before NR.

In the present disclosure, "A or B" may mean "only A", "only B" or "both A and B." In other words, in the present disclosure, "A or B" may be interpreted as "A and/or B". For example, in the present disclosure, "A, B, or C" may mean "only A", "only B", "only C", or "any combination of A, B, C".

A slash (/) or comma used in the present disclosure may mean "and/or". For example, "A/B" may mean "A and/or B". Accordingly, "A/B" may mean "only A", "only B", or "both A and B". For example, "A, B, C" may mean "A, B, or C".

In the present disclosure, "at least one of A and B" may mean "only A", "only B", or "both A and B". In addition, in the present disclosure, the expression "at least one of A or B" or "at least one of A and/or B" may be interpreted as "at least one of A and B".

In addition, in the present disclosure, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present disclosure may mean "for example". Specifically, when indicated as "control information (PDCCH)", it may mean that "PDCCH" is proposed as an example of the "control information". In other words, the "control information" of the present disclosure is not limited to "PDCCH", and "PDCCH" may be proposed as an example of the "control information". In addition, when indicated as "control information (i.e., PDCCH)", it may also mean that "PDCCH" is proposed as an example of the "control information".

A technical feature described individually in one figure in the present disclosure may be individually implemented, or may be simultaneously implemented.

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A corresponding to a new Clean-slate type mobile communication system having the characteristics of high performance, low latency, high availability, and so on. 5G NR may use resources of all spectrum available for usage including low frequency bands of less than 1 GHz, middle frequency bands ranging from 1 GHz to 10 GHz, high frequency (millimeter waves) of 24 GHz or more, and so on.

For clarity in the description, the following description will mostly focus on LTE-A or 5G NR. However, technical features according to an embodiment of the present disclosure will not be limited only to this.

Hereinafter, device(s) to which various embodiments of the present disclosure can be applied will be described.

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 2:
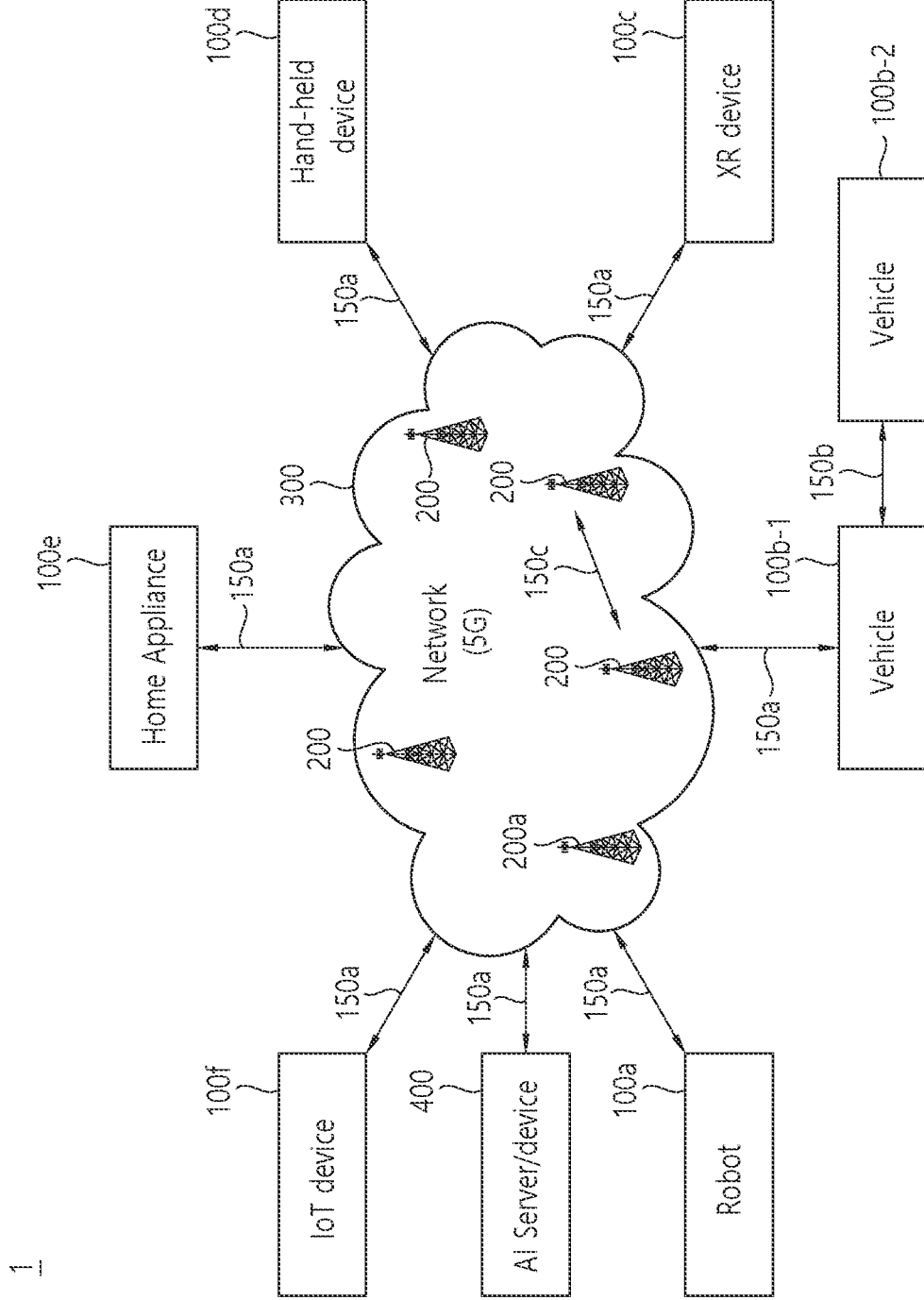
FIG. 2 shows a communication system 1, based on an embodiment of the present disclosure.

FIG. 2 shows a communication system 1, based on an embodiment of the present disclosure.

Referring to FIG. 2, a communication system 1 to which various embodiments of the present disclosure are applied includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100*a*, vehicles 100*b*-1 and 100*b*-2, an eXtended Reality (XR) device 100*c*, a hand-held device 100*d*, a home appliance 100*e*, an Internet of Things (IoT) device 100*f*, and an Artificial Intelligence (AI) device/server 400. For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200*a* may operate as a BS/network node with respect to other wireless devices.

Herein, wireless communication technology implemented in wireless devices 100*a* to 100*f* of the present disclosure may include Narrowband Internet of Things for low-power communication in addition to LTE, NR, and 6G. In this case, for example, NB-IoT technology may be an example of Low Power Wide Area Network (LPWAN) technology and may be implemented as standards such as LTE Cat NB1, and/or LTE Cat NB2, and is not limited to the name described above. Additionally or alternatively, the wireless communication technology implemented in the wireless devices 100a to 100f of the present disclosure may perform communication based on LTE-M technology. In this case, as an example, the LTE-M technology may be an example of the LPWAN and may be called by various names including enhanced Machine Type Communication (eMTC), and the like. For example, the LTE-M technology may be implemented as at least any one of various standards such as 1) LTE CAT 0, 2) LTE Cat M1, 3) LTE Cat M2, 4) LTE non-Bandwidth Limited (non-BL), 5) LTE-MTC, 6) LTE Machine Type Communication, and/or 7) LTE M, and is not limited to the name described above. Additionally or alternatively, the wireless communication technology implemented in the wireless devices 100a to 100f of the present disclosure may include at least one of Bluetooth, Low Power Wide Area Network (LPWAN), and ZigBee considering the low-power communication, and is not limited to the name described above. As an example, the ZigBee technology may generate personal area networks (PAN) related to small/low-power digital communication based on various standards including IEEE 802.15.4, and the like, and may be called by various names.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/ network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g., relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 3:
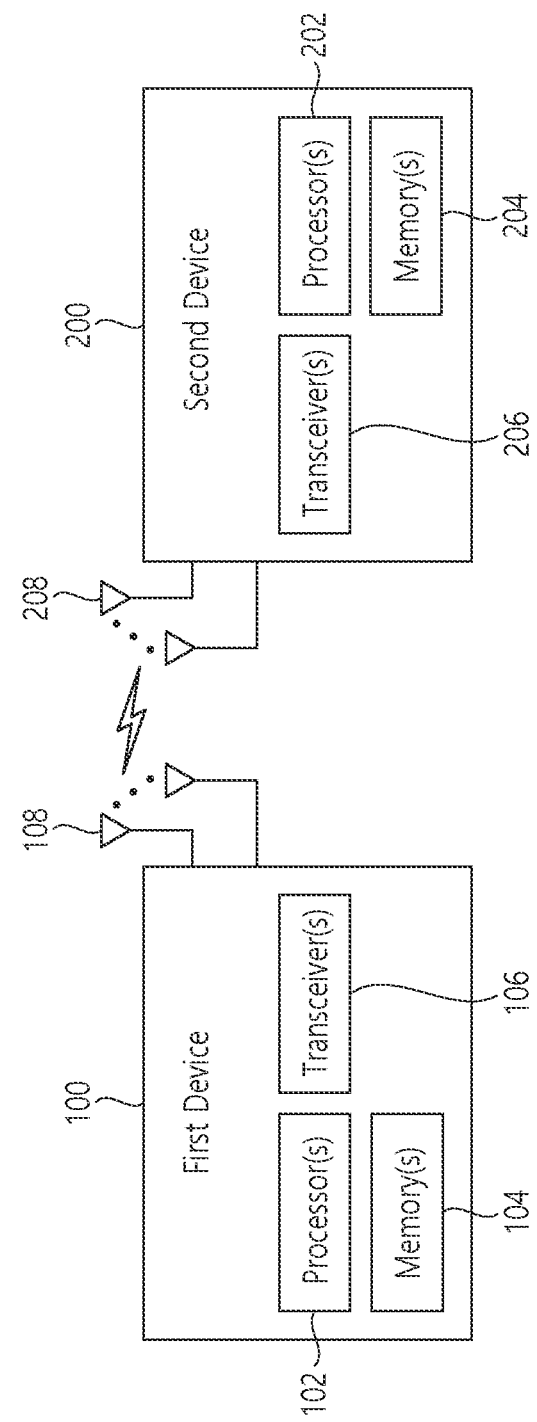
FIG. 3 shows wireless devices, based on an embodiment of the present disclosure.

FIG. 3 shows wireless devices, based on an embodiment of the present disclosure.

Referring to FIG. 3, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 2.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 4:
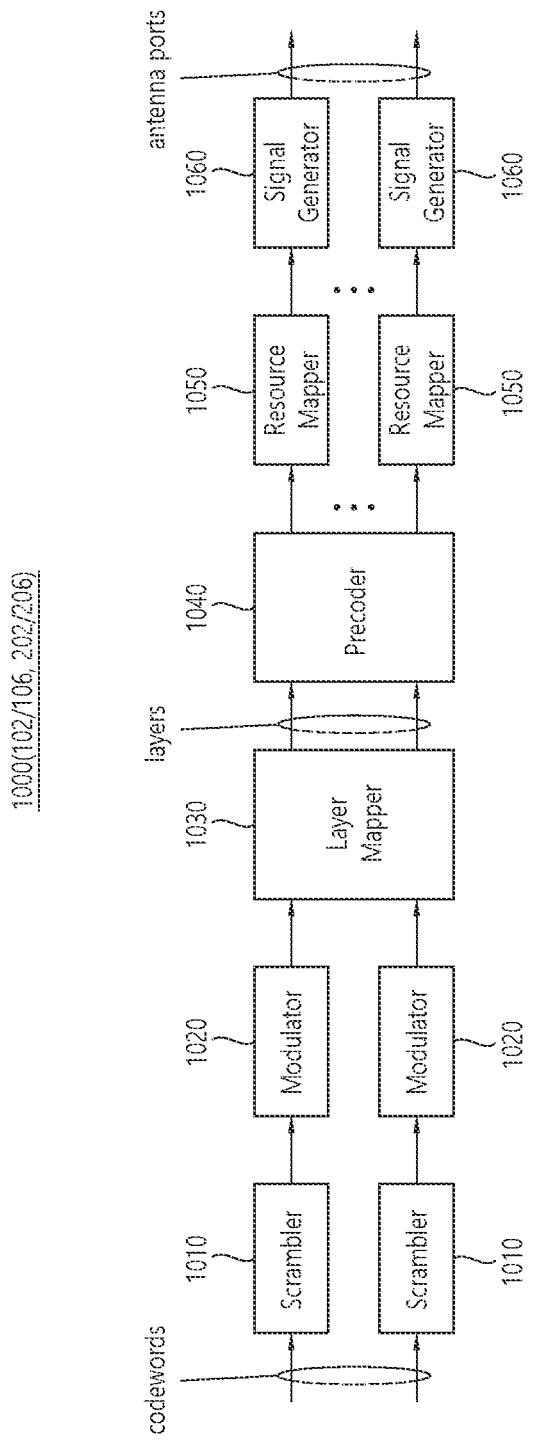
FIG. 4 shows a signal process circuit for a transmission signal, based on an embodiment of the present disclosure.

FIG. 4 shows a signal process circuit for a transmission signal, based on an embodiment of the present disclosure.

Referring to FIG. 4, a signal processing circuit 1000 may include scramblers 1010, modulators 1020, a layer mapper 1030, a precoder 1040, resource mappers 1050, and signal generators 1060. An operation/function of FIG. 4 may be performed, without being limited to, the processors 102 and 202 and/or the transceivers 106 and 206 of FIG. 3. Hardware elements of FIG. 4 may be implemented by the processors 102 and 202 and/or the transceivers 106 and 206 of FIG. 3. For example, blocks 1010 to 1060 may be implemented by the processors 102 and 202 of FIG. 3. Alternatively, the blocks 1010 to 1050 may be implemented by the processors 102 and 202 of FIG. 3 and the block 1060 may be implemented by the transceivers 106 and 206 of FIG. 3.

Codewords may be converted into radio signals via the signal processing circuit 1000 of FIG. 4. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 4. For example, the wireless devices (e.g., 100 and 200 of FIG. 3) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Figure 5:
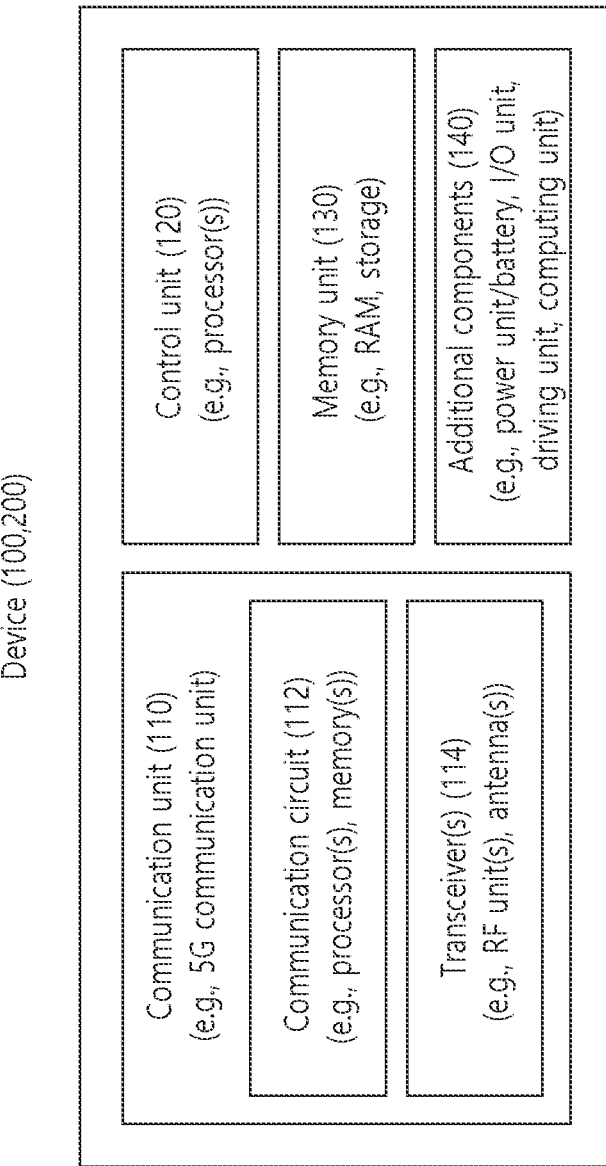
FIG. 5 shows another example of a wireless device, based on an embodiment of the present disclosure.

FIG. 5 shows another example of a wireless device, based on an embodiment of the present disclosure. The wireless device may be implemented in various forms according to a use-case/service (refer to FIG. 2).

Referring to FIG. 5, wireless devices 100 and 200 may correspond to the wireless devices 100 and 200 of FIG. 3 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 3. For example, the transceiver(s) 114 may include the one or more transceivers 106 and 206 and/or the one or more antennas 108 and 208 of FIG. 3. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 2), the vehicles (100b-1 and 100b-2 of FIG. 2), the XR device (100c of FIG. 2), the hand-held device (100d of FIG. 2), the home appliance (100e of FIG. 2), the IoT device (100f of FIG. 2), a digital broadcast terminal, a hologram device, a public safety device, an MTC device, a medicine device, a fintech device (or a finance device), a security device, a climate/environment device, the AI server/device (400 of FIG. 2), the BSs (200 of FIG. 2), a network node, etc. The wireless device may be used in a mobile or fixed place according to a use-example/service.

In FIG. 5, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 5 will be described in detail with reference to the drawings.

Figure 6:
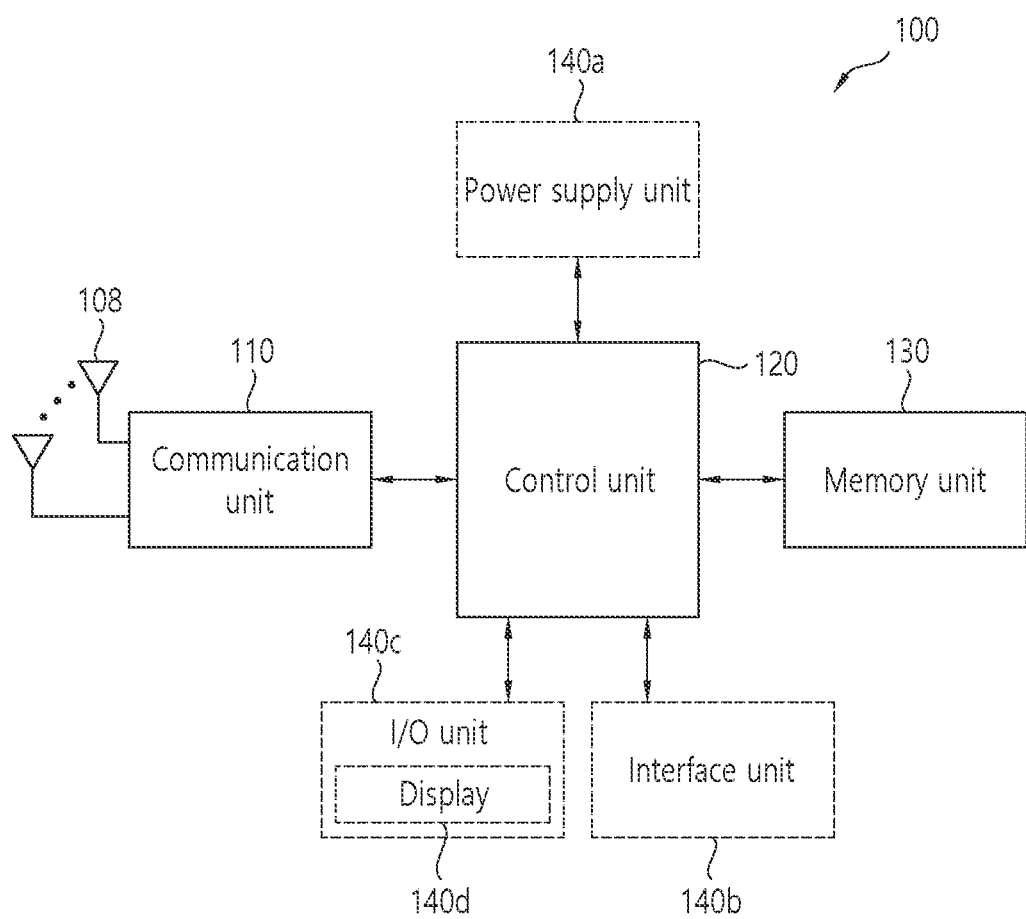
FIG. 6 shows a hand-held device, based on an embodiment of the present disclosure.

FIG. 6 shows a hand-held device, based on an embodiment of the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 6, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 5, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

Figure 7:
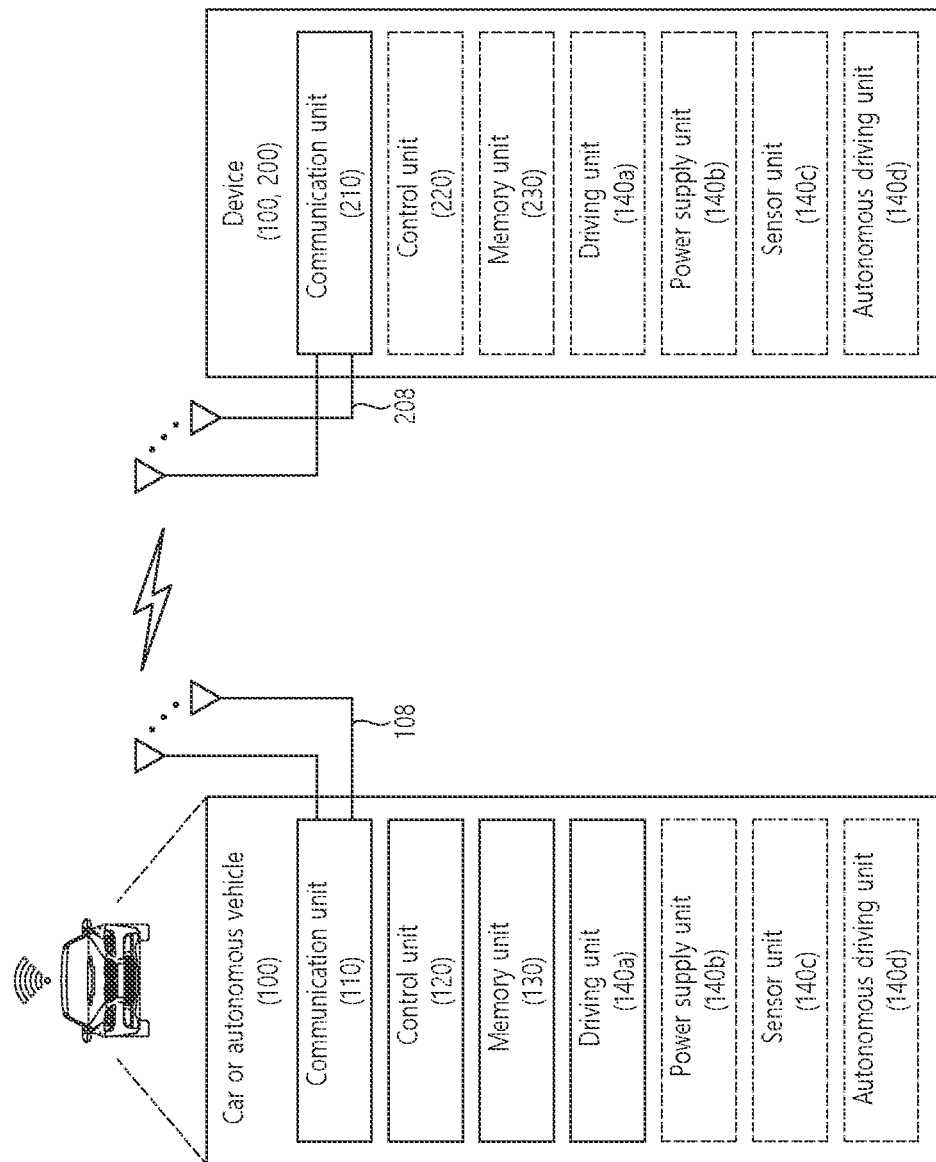
FIG. 7 shows a vehicle or an autonomous vehicle, based on an embodiment of the present disclosure.

FIG. 7 shows a vehicle or an autonomous vehicle, based on an embodiment of the present disclosure. The vehicle or autonomous vehicle may be implemented by a mobile robot, a car, a train, a manned/unmanned Aerial Vehicle (AV), a ship, etc.

Referring to FIG. 7, a vehicle or autonomous vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 5, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous vehicle 100. The control unit 120 may include an Electronic Control Unit (ECU). The driving unit 140a may cause the vehicle or the autonomous vehicle 100 to drive on a road. The driving unit 140a may include an engine, a motor, a powertrain, a wheel, a brake, a steering device, etc. The power supply unit 140b may supply power to the vehicle or the autonomous vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous vehicles and provide the predicted traffic information data to the vehicles or the autonomous vehicles.

Figure 8:
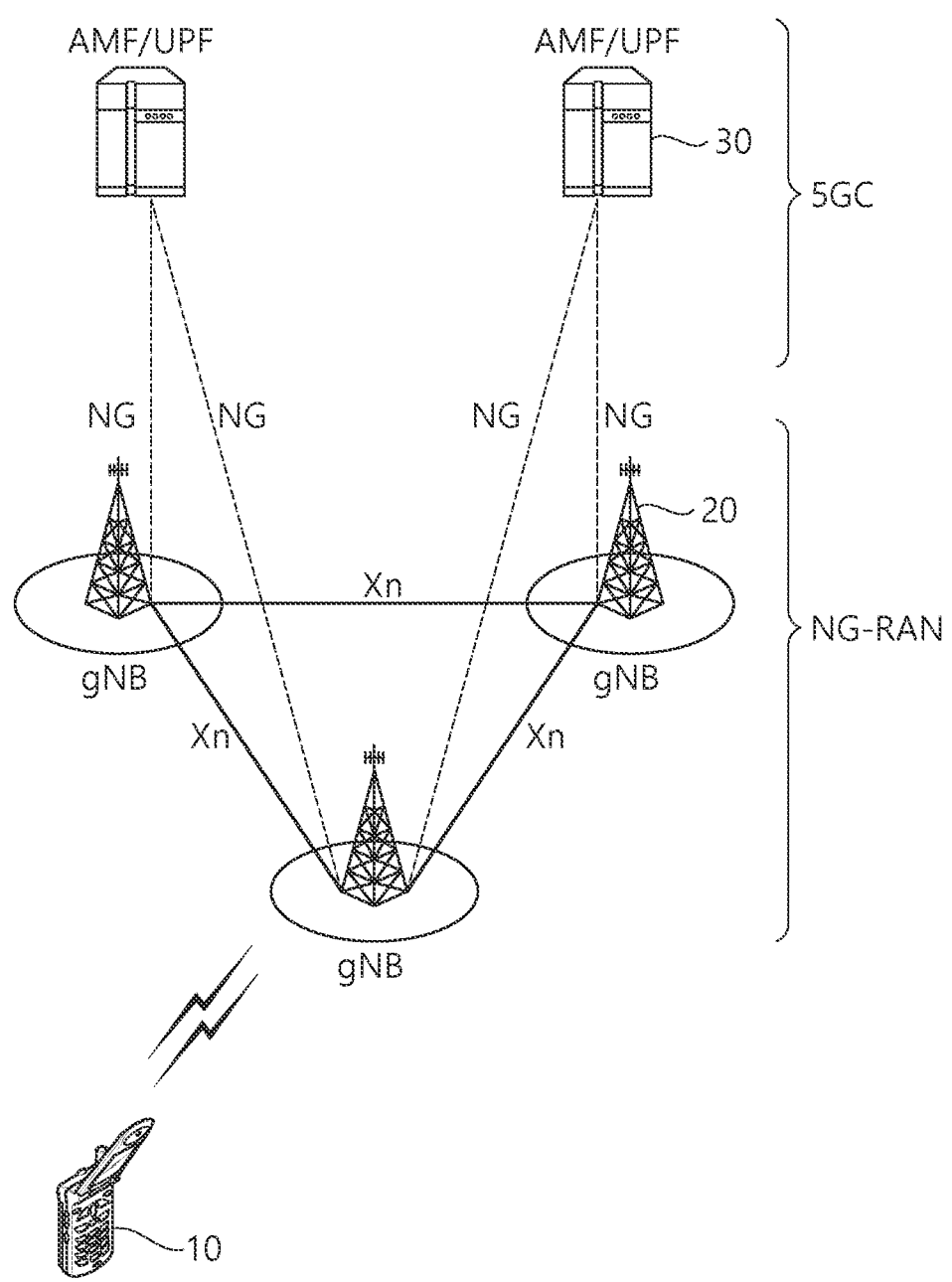
FIG. 8 shows a structure of an NR system, based on an embodiment of the present disclosure.

FIG. 8 shows a structure of an NR system, based on an embodiment of the present disclosure. The embodiment of FIG. 8 may be combined with various embodiments of the present disclosure.

Referring to FIG. 8, a next generation-radio access network (NG-RAN) may include a BS 20 providing a UE 10 with a user plane and control plane protocol termination. For example, the BS 20 may include a next generation-Node B (gNB) and/or an evolved-NodeB (eNB). For example, the UE 10 may be fixed or mobile and may be referred to as other terms, such as a mobile station (MS), a user terminal (UT), a subscriber station (SS), a mobile terminal (MT), wireless device, and so on. For example, the BS may be referred to as a fixed station which communicates with the UE 10 and may be referred to as other terms, such as a base transceiver system (BTS), an access point (AP), and so on.

The embodiment of FIG. 8 exemplifies a case where only the gNB is included. The BSs 20 may be connected to one another via Xn interface. The BS 20 may be connected to one another via 5th generation (5G) core network (5GC) and NG interface. More specifically, the BSs 20 may be connected to an access and mobility management function (AMF) 30 via NG-C interface, and may be connected to a user plane function (UPF) 30 via NG-U interface.

Figure 9:
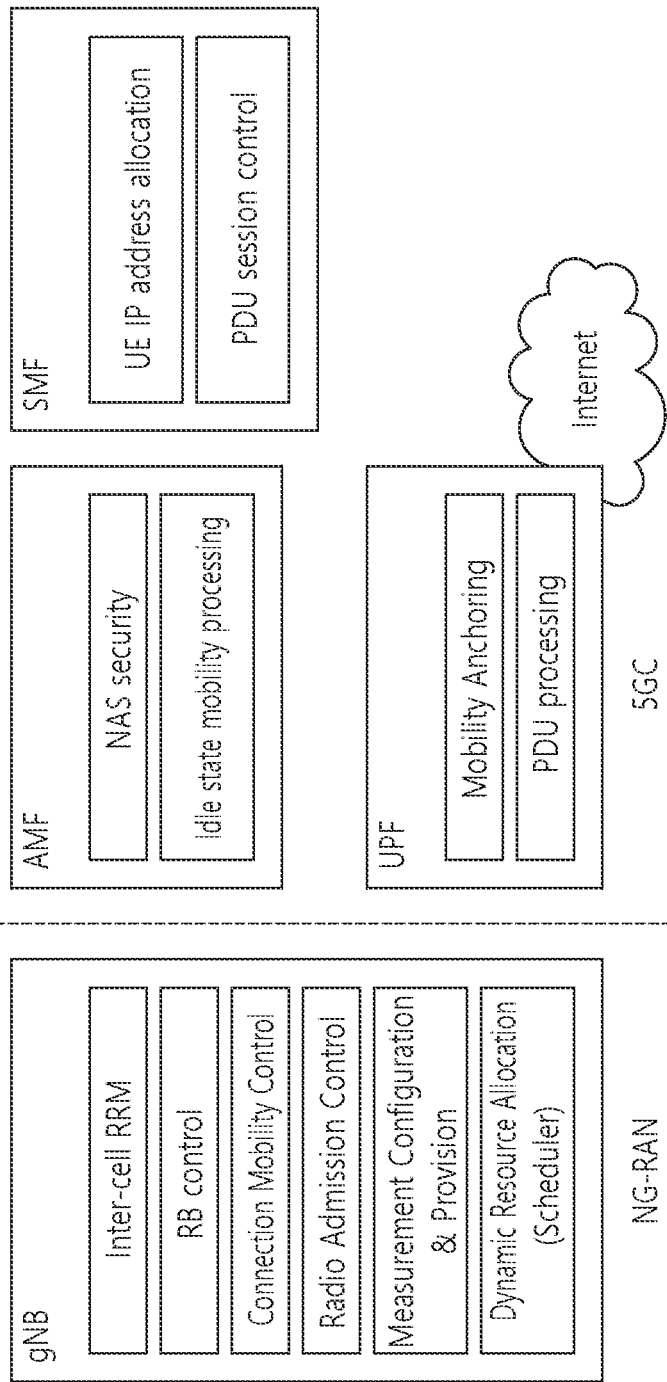
FIG. 9 shows a functional division between an NG-RAN and a 5GC, based on an embodiment of the present disclosure.

FIG. 9 shows a functional division between an NG-RAN and a 5GC, based on an embodiment of the present disclosure. The embodiment of FIG. 9 may be combined with various embodiments of the present disclosure.

Referring to FIG. 9, the gNB may provide functions, such as Inter Cell Radio Resource Management (RRM), Radio Bearer (RB) control, Connection Mobility Control, Radio Admission Control, Measurement Configuration & Provision, Dynamic Resource Allocation, and so on. An AMF may provide functions, such as Non Access Stratum (NAS) security, idle state mobility processing, and so on. A UPF may provide functions, such as Mobility Anchoring, Protocol Data Unit (PDU) processing, and so on. A Session Management Function (SMF) may provide functions, such as user equipment (UE) Internet Protocol (IP) address allocation, PDU session control, and so on.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

FIG. 10 shows a radio protocol architecture, based on an embodiment of the present disclosure. The embodiment of FIG. 10 may be combined with various embodiments of the present disclosure. Specifically, FIG. 10(a) shows a radio protocol architecture for a user plane, and FIG. 10(b) shows a radio protocol architecture for a control plane. The user plane corresponds to a protocol stack for user data transmission, and the control plane corresponds to a protocol stack for control signal transmission.

Referring to FIG. 10, a physical layer provides an upper layer with an information transfer service through a physical channel. The physical layer is connected to a medium access control (MAC) layer which is an upper layer of the physical layer through a transport channel. Data is transferred between the MAC layer and the physical layer through the transport channel. The transport channel is classified according to how and with what characteristics data is transmitted through a radio interface.

Between different physical layers, i.e., a physical layer of a transmitter and a physical layer of a receiver, data are transferred through the physical channel. The physical channel is modulated using an orthogonal frequency division multiplexing (OFDM) scheme, and utilizes time and frequency as a radio resource.

The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. The MAC layer provides data transfer services over logical channels.

The RLC layer performs concatenation, segmentation, and reassembly of Radio Link Control Service Data Unit (RLC SDU). In order to ensure diverse quality of service (QoS) required by a radio bearer (RB), the RLC layer provides three types of operation modes, i.e., a transparent mode (TM), an unacknowledged mode (UM), and an acknowledged mode (AM). An AM RLC provides error correction through an automatic repeat request (ARQ).

A radio resource control (RRC) layer is defined only in the control plane. The RRC layer serves to control the logical channel, the transport channel, and the physical channel in association with configuration, reconfiguration and release of RBs. The RB is a logical path provided by the first layer (i.e., the physical layer or the PHY layer) and the second layer (i.e., the MAC layer, the RLC layer, and the packet data convergence protocol (PDCP) layer) for data delivery between the UE and the network.

Functions of a packet data convergence protocol (PDCP) layer in the user plane include user data delivery, header compression, and ciphering. Functions of a PDCP layer in the control plane include control-plane data delivery and ciphering/integrity protection.

A service data adaptation protocol (SDAP) layer is defined only in a user plane. The SDAP layer performs mapping between a Quality of Service (QoS) flow and a data radio bearer (DRB) and QoS flow ID (QFI) marking in both DL and UL packets.

The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the E-UTRAN, the UE is in an RRC_CONNECTED state, and, otherwise, the UE may be in an RRC_IDLE state. In case of the NR, an RRC_INACTIVE state is additionally defined, and a UE being in the RRC_INACTIVE state may maintain its connection with a core network whereas its connection with the BS is released.

Data is transmitted from the network to the UE through a downlink transport channel. Examples of the downlink transport channel include a broadcast channel (BCH) for transmitting system information and a downlink-shared channel (SCH) for transmitting user traffic or control messages. Traffic of downlink multicast or broadcast services or the control messages can be transmitted on the downlink-SCH or an additional downlink multicast channel (MCH). Data is transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

The physical channel includes several OFDM symbols in a time domain and several sub-carriers in a frequency domain. One sub-frame includes a plurality of OFDM symbols in the time domain. A resource block is a unit of resource allocation, and consists of a plurality of OFDM symbols and a plurality of sub-carriers. Further, each sub-frame may use specific sub-carriers of specific OFDM symbols (e.g., a first OFDM symbol) of a corresponding subframe for a physical downlink control channel (PDCCH), i.e., an L1/L2 control channel. A transmission time interval (TTI) is a unit time of subframe transmission.

Figure 11:
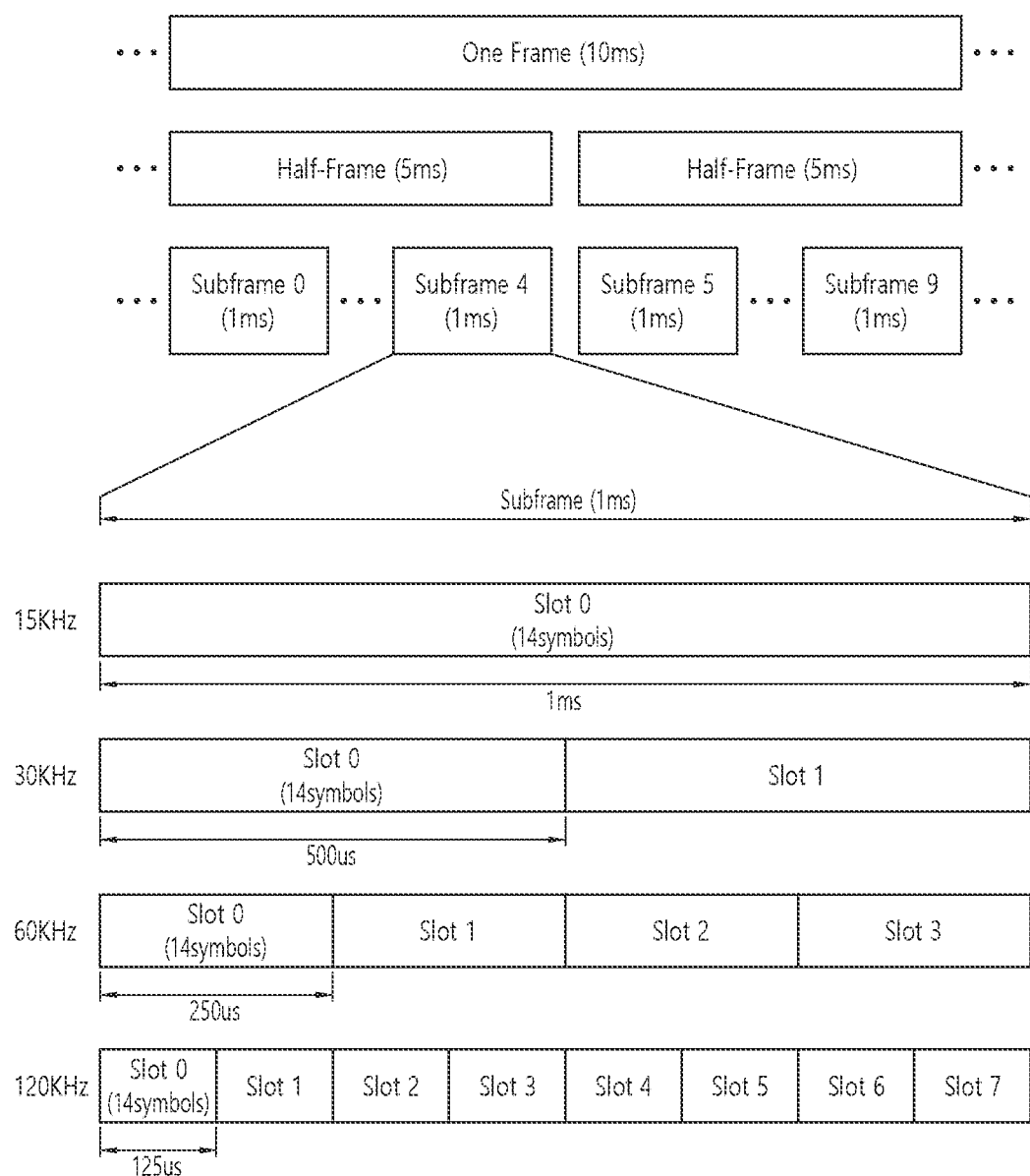
FIG. 11 shows a structure of an NR system, based on an embodiment of the present disclosure.

FIG. 11 shows a structure of an NR system, based on an embodiment of the present disclosure. The embodiment of FIG. 11 may be combined with various embodiments of the present disclosure.

Referring to FIG. 11, in the NR, a radio frame may be used for performing uplink and downlink transmission. A radio frame has a length of 10 ms and may be defined to be configured of two half-frames (HFs). A half-frame may include five 1 ms subframes (SFs). A subframe (SF) may be divided into one or more slots, and the number of slots within a subframe may be determined based on subcarrier spacing (SCS). Each slot may include 12 or 14 OFDM(A) symbols according to a cyclic prefix (CP).

In case of using a normal CP, each slot may include 14 symbols. In case of using an extended CP, each slot may include 12 symbols. Herein, a symbol may include an OFDM symbol (or CP-OFDM symbol) and a Single Carrier-FDMA (SC-FDMA) symbol (or Discrete Fourier Transform-spread-OFDM (DFT-s-OFDM) symbol).

Table 1 shown below represents an example of a number of symbols per slot ($N^{slot}_{symb}$), a number slots per frame ($N^{frame,u}_{slot}$), and a number of slots per subframe ($N^{subframe,u}_{slot}$) based on an SCS configuration (u), in a case where a normal CP is used.

TABLE 1

| SCS (15*2$^u$) | $N^{slot}_{symb}$ | $N^{frame, u}_{slot}$ | $N^{subframe, u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 shows an example of a number of symbols per slot, a number of slots per frame, and a number of slots per subframe based on the SCS, in a case where an extended CP is used.

TABLE 2

| SCS (15*2$^u$) | $N^{slot}_{symb}$ | $N^{frame, u}_{slot}$ | $N^{subframe, u}_{slot}$ |
|---|---|---|---|
| 60 KHz (u = 2) | 12 | 40 | 4 |

In an NR system, OFDM(A) numerologies (e.g., SCS, CP length, and so on) between multiple cells being integrate to one UE may be differently configured. Accordingly, a (absolute time) duration (or section) of a time resource (e.g., subframe, slot or TTI) (collectively referred to as a time unit (TU) for simplicity) being configured of the same number of symbols may be differently configured in the integrated cells.

In the NR, multiple numerologies or SCSs for supporting diverse 5G services may be supported. For example, in case an SCS is 15 kHz, a wide area of the conventional cellular bands may be supported, and, in case an SCS is 30 kHz/60 kHz a dense-urban, lower latency, wider carrier bandwidth may be supported. In case the SCS is 60 kHz or higher, a bandwidth that is greater than 24.25 GHz may be used in order to overcome phase noise.

An NR frequency band may be defined as two different types of frequency ranges. The two different types of frequency ranges may be FR1 and FR2. The values of the frequency ranges may be changed (or varied), and, for example, the two different types of frequency ranges may be as shown below in Table 3. Among the frequency ranges that are used in an NR system, FR1 may mean a "sub 6 GHz range", and FR2 may mean an "above 6 GHz range" and may also be referred to as a millimeter wave (mmW).

TABLE 3

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As described above, the values of the frequency ranges in the NR system may be changed (or varied). For example, as shown below in Table 4, FR1 may include a band within a range of 410 MHz to 7125 MHz. More specifically, FR1 may include a frequency band of 6 GHz (or 5850, 5900, 5925 MHz, and so on) and higher. For example, a frequency band of 6 GHz (or 5850, 5900, 5925 MHz, and so on) and higher being included in FR1 mat include an unlicensed band. The unlicensed band may be used for diverse purposes, e.g., the unlicensed band for vehicle-specific communication (e.g., automated driving).

TABLE 4

| Frequency Range designation | Corresponding frequency range | Subcarrier Spacing (SCS) |
|---|---|---|
| FR1 | 410 MHz-7125 MHz | 15, 30, 60 kHz |
| FR2 | 24250 MHz-52600 MHz | 60, 120, 240 kHz |

Figure 12:
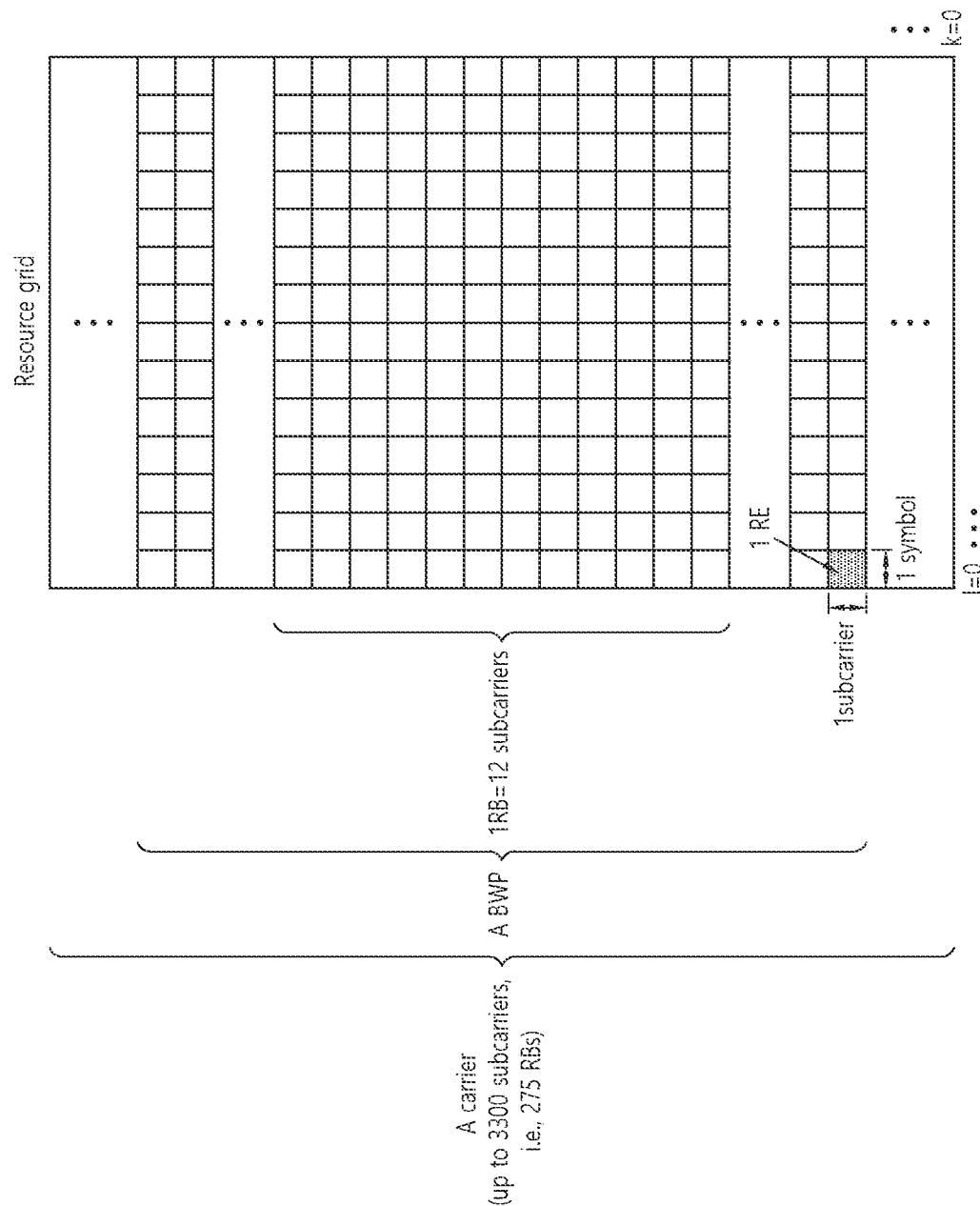
FIG. 12 shows a structure of a slot of an NR frame, based on an embodiment of the present disclosure.

FIG. 12 shows a structure of a slot of an NR frame, based on an embodiment of the present disclosure. The embodiment of FIG. 12 may be combined with various embodiments of the present disclosure.

Referring to FIG. 12, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols.

A carrier includes a plurality of subcarriers in a frequency domain. A Resource Block (RB) may be defined as a plurality of consecutive subcarriers (e.g., 12 subcarriers) in the frequency domain. A Bandwidth Part (BWP) may be defined as a plurality of consecutive (Physical) Resource Blocks ((P)RBs) in the frequency domain, and the BWP may correspond to one numerology (e.g., SCS, CP length, and so on). A carrier may include a maximum of N number BWPs (e.g., 5 BWPs). Data communication may be performed via an activated BWP. Each element may be referred to as a Resource Element (RE) within a resource grid and one complex symbol may be mapped to each element.

Meanwhile, a radio interface between a UE and another UE or a radio interface between the UE and a network may consist of an L1 layer, an L2 layer, and an L3 layer. In various embodiments of the present disclosure, the L1 layer may imply a physical layer. In addition, for example, the L2 layer may imply at least one of a MAC layer, an RLC layer, a PDCP layer, and an SDAP layer. In addition, for example, the L3 layer may imply an RRC layer.

Hereinafter, a bandwidth part (BWP) and a carrier will be described.

The BWP may be a set of consecutive physical resource blocks (PRBs) in a given numerology. The PRB may be selected from consecutive sub-sets of common resource blocks (CRBs) for the given numerology on a given carrier.

When using bandwidth adaptation (BA), a reception bandwidth and transmission bandwidth of a UE are not necessarily as large as a bandwidth of a cell, and the reception bandwidth and transmission bandwidth of the BS may be adjusted. For example, a network/BS may inform the UE of bandwidth adjustment. For example, the UE receive information/configuration for bandwidth adjustment from the network/BS. In this case, the UE may perform bandwidth adjustment based on the received information/configuration. For example, the bandwidth adjustment may include an increase/decrease of the bandwidth, a position change of the bandwidth, or a change in subcarrier spacing of the bandwidth.

For example, the bandwidth may be decreased during a period in which activity is low to save power. For example, the position of the bandwidth may move in a frequency domain. For example, the position of the bandwidth may move in the frequency domain to increase scheduling flexibility. For example, the subcarrier spacing of the bandwidth may be changed. For example, the subcarrier spacing of the bandwidth may be changed to allow a different service. A subset of a total cell bandwidth of a cell may be called a bandwidth part (BWP). The BA may be performed when the BS/network configures the BWP to the UE and the BS/network informs the UE of the BWP currently in an active state among the configured BWPs.

For example, the BWP may be at least any one of an active BWP, an initial BWP, and/or a default BWP. For example, the UE may not monitor downlink radio link quality in a DL BWP other than an active DL BWP on a primary cell (PCell). For example, the UE may not receive PDCCH, physical downlink shared channel (PDSCH), or channel state information-reference signal (CSI-RS) (excluding RRM) outside the active DL BWP. For example, the UE may not trigger a channel state information (CSI) report for the inactive DL BWP. For example, the UE may not transmit physical uplink control channel (PUCCH) or physical uplink shared channel (PUSCH) outside an active UL BWP. For example, in a downlink case, the initial BWP may be given as a consecutive RB set for a remaining minimum system information (RMSI) control resource set (CORESET) (configured by physical broadcast channel (PBCH)). For example, in an uplink case, the initial BWP may be given by system information block (SIB) for a random access procedure. For example, the default BWP may be configured by a higher layer. For example, an initial value of the default BWP may be an initial DL BWP. For energy saving, if the UE fails to detect downlink control information (DCI) during a specific period, the UE may switch the active BWP of the UE to the default BWP.

Meanwhile, the BWP may be defined for SL. The same SL BWP may be used in transmission and reception. For example, a transmitting UE may transmit an SL channel or an SL signal on a specific BWP, and a receiving UE may receive the SL channel or the SL signal on the specific BWP. In a licensed carrier, the SL BWP may be defined separately from a Uu BWP, and the SL BWP may have configuration signaling separate from the Uu BWP. For example, the UE may receive a configuration for the SL BWP from the BS/network. The SL BWP may be (pre-)configured in a carrier with respect to an out-of-coverage NR V2X UE and an RRC_IDLE UE. For the UE in the RRC_CONNECTED mode, at least one SL BWP may be activated in the carrier.

Figure 13:
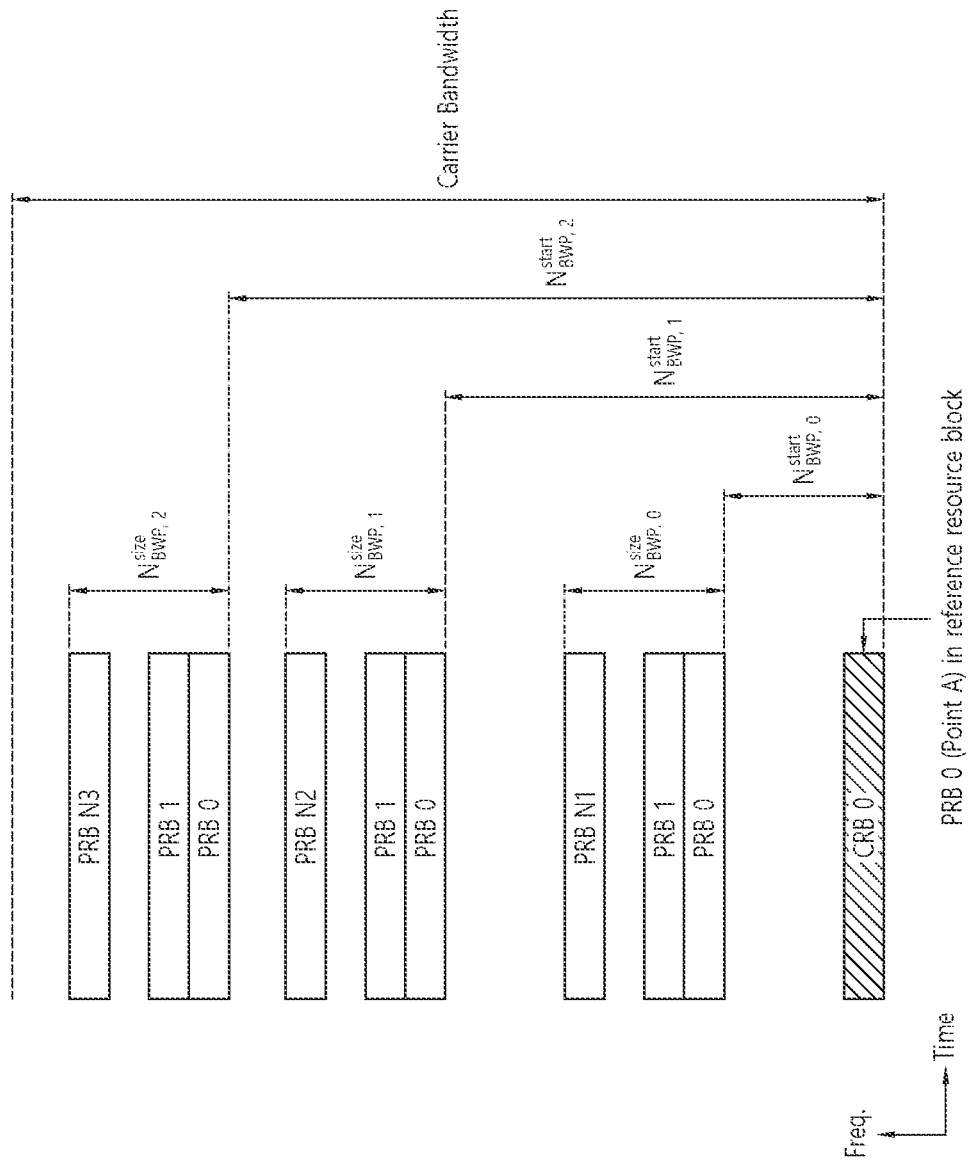
FIG. 13 shows an example of a BWP, based on an embodiment of the present disclosure.

FIG. 13 shows an example of a BWP, based on an embodiment of the present disclosure. The embodiment of FIG. 13 may be combined with various embodiments of the present disclosure. It is assumed in the embodiment of FIG. 13 that the number of BWPs is 3.

Referring to FIG. 13, a common resource block (CRB) may be a carrier resource block numbered from one end of a carrier band to the other end thereof. In addition, the PRB may be a resource block numbered within each BWP. A point A may indicate a common reference point for a resource block grid.

The BWP may be configured by a point A, an offset $N^{start}_{BWP}$ from the point A, and a bandwidth $N^{size}_{BWP}$. For example, the point A may be an external reference point of a PRB of a carrier in which a subcarrier 0 of all numerologies (e.g., all numerologies supported by a network on that carrier) is aligned. For example, the offset may be a PRB interval between a lowest subcarrier and the point A in a given numerology. For example, the bandwidth may be the number of PRBs in the given numerology.

Hereinafter, V2X or SL communication will be described.

FIG. 14 shows a radio protocol architecture for a SL communication, based on an embodiment of the present disclosure. The embodiment of FIG. 14 may be combined with various embodiments of the present disclosure. More specifically, FIG. 14(a) shows a user plane protocol stack, and FIG. 14(b) shows a control plane protocol stack.

Hereinafter, a sidelink synchronization signal (SLSS) and synchronization information will be described.

The SLSS may include a primary sidelink synchronization signal (PSSS) and a secondary sidelink synchronization signal (SSSS), as an SL-specific sequence. The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, a UE may use the S-PSS for initial signal detection and for synchronization acquisition. For example, the UE may use the S-PSS and the S-SSS for acquisition of detailed synchronization and for detection of a synchronization signal ID.

A physical sidelink broadcast channel (PSBCH) may be a (broadcast) channel for transmitting default (system) information which must be first known by the UE before SL signal transmission/reception. For example, the default information may be information related to SLSS, a duplex mode (DM), a time division duplex (TDD) uplink/downlink (UL/DL) configuration, information related to a resource pool, a type of an application related to the SLSS, a subframe offset, broadcast information, or the like. For example, for evaluation of PSBCH performance, in NR V2X, a payload size of the PSBCH may be 56 bits including 24-bit CRC.

The S-PSS, the S-SSS, and the PSBCH may be included in a block format (e.g., SL synchronization signal (SS)/PSBCH block, hereinafter, sidelink-synchronization signal block (S-SSB)) supporting periodical transmission. The S-SSB may have the same numerology (i.e., SCS and CP length) as a physical sidelink control channel (PSCCH)/physical sidelink shared channel (PSSCH) in a carrier, and a transmission bandwidth may exist within a (pre-)configured sidelink (SL) BWP. For example, the S-SSB may have a bandwidth of 11 resource blocks (RBs). For example, the PSBCH may exist across 11 RBs. In addition, a frequency position of the S-SSB may be (pre-)configured. Accordingly, the UE does not have to perform hypothesis detection at frequency to discover the S-SSB in the carrier.

Figure 15:
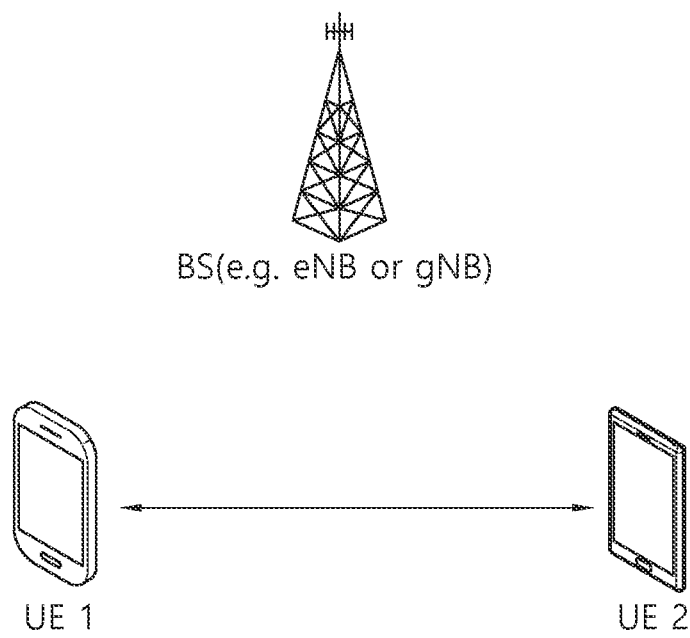
FIG. 15 shows a UE performing V2X or SL communication, based on an embodiment of the present disclosure.

FIG. 15 shows a UE performing V2X or SL communication, based on an embodiment of the present disclosure. The embodiment of FIG. 15 may be combined with various embodiments of the present disclosure.

Referring to FIG. 15, in V2X or SL communication, the term 'UE' may generally imply a UE of a user. However, if a network equipment such as a BS transmits/receives a signal according to a communication scheme between UEs, the BS may also be regarded as a sort of the UE. For example, a UE 1 may be a first apparatus 100, and a UE 2 may be a second apparatus 200.

For example, the UE 1 may select a resource unit corresponding to a specific resource in a resource pool which implies a set of series of resources. In addition, the UE 1 may transmit an SL signal by using the resource unit. For example, a resource pool in which the UE 1 is capable of transmitting a signal may be configured to the UE 2 which is a receiving UE, and the signal of the UE 1 may be detected in the resource pool.

Herein, if the UE 1 is within a connectivity range of the BS, the BS may inform the UE 1 of the resource pool. Otherwise, if the UE 1 is out of the connectivity range of the BS, another UE may inform the UE 1 of the resource pool, or the UE 1 may use a pre-configured resource pool.

In general, the resource pool may be configured in unit of a plurality of resources, and each UE may select a unit of one or a plurality of resources to use it in SL signal transmission thereof.

Hereinafter, resource allocation in SL will be described.

Figure 16:
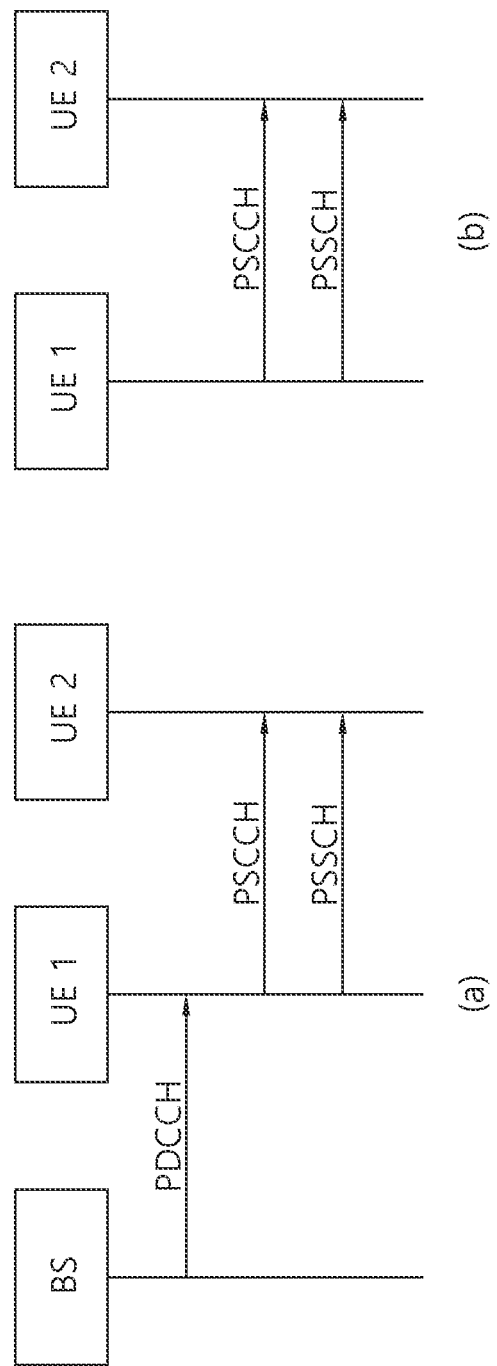
FIG. 16 shows a procedure of performing V2X or SL communication by a UE based on a transmission mode, based on an embodiment of the present disclosure.

FIG. 16 shows a procedure of performing V2X or SL communication by a UE based on a transmission mode, based on an embodiment of the present disclosure. The embodiment of FIG. 16 may be combined with various embodiments of the present disclosure. In various embodiments of the present disclosure, the transmission mode may be called a mode or a resource allocation mode. Hereinafter, for convenience of explanation, in LTE, the transmission mode may be called an LTE transmission mode. In NR, the transmission mode may be called an NR resource allocation mode.

For example, FIG. 16(a) shows a UE operation related to an LTE transmission mode 1 or an LTE transmission mode 3. Alternatively, for example, FIG. 16(a) shows a UE operation related to an NR resource allocation mode 1. For example, the LTE transmission mode 1 may be applied to general SL communication, and the LTE transmission mode 3 may be applied to V2X communication.

For example, FIG. 16(b) shows a UE operation related to an LTE transmission mode 2 or an LTE transmission mode 4. Alternatively, for example, FIG. 16(b) shows a UE operation related to an NR resource allocation mode 2.

Referring to FIG. 16(a), in the LTE transmission mode 1, the LTE transmission mode 3, or the NR resource allocation mode 1, a BS may schedule an SL resource to be used by the UE for SL transmission. For example, the BS may perform resource scheduling to a UE 1 through a PDCCH (more specifically, downlink control information (DCI)), and the UE 1 may perform V2X or SL communication with respect to a UE 2 according to the resource scheduling. For example, the UE 1 may transmit a sidelink control information (SCI) to the UE 2 through a physical sidelink control channel (PSCCH), and thereafter transmit data based on the SCI to the UE 2 through a physical sidelink shared channel (PSSCH).

Referring to FIG. 16(b), in the LTE transmission mode 2, the LTE transmission mode 4, or the NR resource allocation mode 2, the UE may determine an SL transmission resource within an SL resource configured by a BS/network or a pre-configured SL resource. For example, the configured SL resource or the pre-configured SL resource may be a resource pool. For example, the UE may autonomously select or schedule a resource for SL transmission. For example, the UE may perform SL communication by autonomously selecting a resource within a configured resource pool. For example, the UE may autonomously select a resource within a selective window by performing a sensing and resource (re)selection procedure. For example, the sensing may be performed in unit of subchannels. In addition, the UE 1 which has autonomously selected the resource within the resource pool may transmit the SCI to the UE 2 through a PSCCH, and thereafter may transmit data based on the SCI to the UE 2 through a PSSCH.

Figure 17:
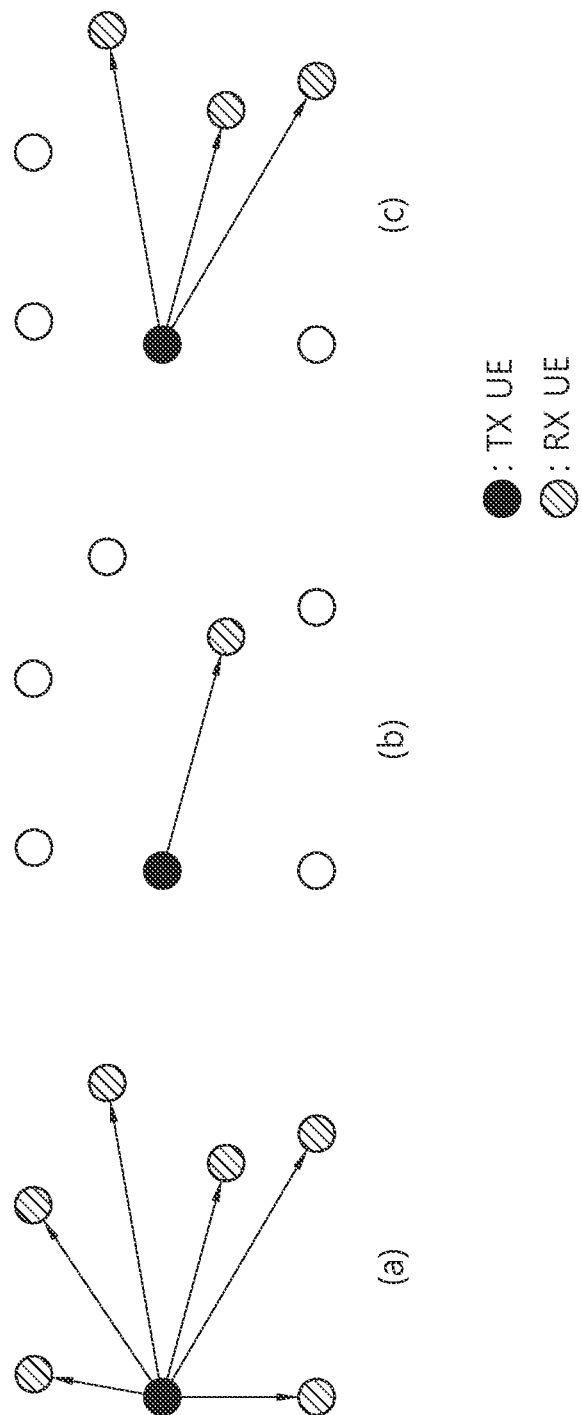
FIG. 17 shows three cast types, based on an embodiment of the present disclosure.

FIG. 17 shows three cast types, based on an embodiment of the present disclosure. The embodiment of FIG. 17 may be combined with various embodiments of the present disclosure. Specifically, FIG. 17(a) shows broadcast-type SL communication, FIG. 17(b) shows unicast type-SL communication, and FIG. 17(c) shows groupcast-type SL communication. In case of the unicast-type SL communication, a UE may perform one-to-one communication with respect to another UE. In case of the groupcast-type SL transmission, the UE may perform SL communication with respect to one or more UEs in a group to which the UE belongs. In various embodiments of the present disclosure, SL groupcast communication may be replaced with SL multicast communication, SL one-to-many communication, or the like.

Meanwhile, in the present disclosure, for example, a transmitting UE (TX UE) may be a UE which transmits data to a (target) receiving UE (RX UE). For example, the TX UE may be a UE which performs PSCCH transmission and/or PSSCH transmission. Additionally/alternatively, the TX UE may be a UE which transmits SL CSI-RS(s) and/or a SL CSI report request indicator to the (target) RX UE. Additionally/alternatively, the TX UE may be a UE which transmits a (control) channel (e.g., PSCCH, PSSCH, etc.) and/or reference signal(s) on the (control) channel (e.g., DM-RS, CSI-RS, etc.), to be used for a SL RLM operation and/or a SL RLF operation of the (target) RX UE.

Meanwhile, in the present disclosure, for example, a receiving UE (RX UE) may be a UE which transmits SL HARQ feedback to a transmitting UE (TX UE) based on whether decoding of data received from the TX UE is successful and/or whether detection/decoding of a PSCCH (related to PSSCH scheduling) transmitted by the TX UE is successful.

Additionally/alternatively, the RX UE may be a UE which performs SL CSI transmission to the TX UE based on SL CSI-RS(s) and/or a SL CSI report request indicator received from the TX UE. Additionally/alternatively, the RX UE is a UE which transmits a SL (L1) RSRP measurement value, to the TX UE, measured based on (pre-defined) reference signal(s) and/or a SL (L1) RSRP report request indicator received from the TX UE. Additionally/alternatively, the RX UE may be a UE which transmits data of the RX UE to the TX UE.

Additionally/alternatively, the RX UE may be a UE which performs a SL RLM operation and/or a SL RLF operation based on a (pre-configured) (control) channel and/or reference signal(s) on the (control) channel received from the TX UE.

Meanwhile, in the present disclosure, for example, in case the RX UE transmits SL HARQ feedback information for a PSSCH and/or a PSCCH received from the TX UE, the following options or some of the following options may be considered. Herein, for example, the following options or some of the following options may be limitedly applied only if the RX UE successfully decodes/detects a PSCCH scheduling a PSSCH.

Option 1) NACK information may be transmitted to the TX UE only if the RX UE fails to decode/receive the PSSCH received from the TX UE.

Option 2) If the RX UE succeeds in decoding/receiving the PSSCH received from the TX UE, ACK information may be transmitted to the TX UE, and if the RX UE fails to decode/receive the PSSCH, NACK information may be transmitted to the TX UE.

Meanwhile, in the present disclosure, for example, the TX UE may transmit the following information or some of the following information to the RX UE through SCI(s). Herein, for example, the TX UE may transmit some or all of the following information to the RX UE through a first SCI and/or a second SCI.

- PSSCH (and/or PSCCH) related resource allocation information (e.g., the location/number of time/frequency resources, resource reservation information (e.g., period))
- SL CSI report request indicator or SL (L1) RSRP (and/or SL (L1) RSRQ and/or SL (L1) RSSI) report request indicator
- SL CSI transmission indicator (or SL (L1) RSRP (and/or SL (L1) RSRQ and/or SL (L1) RSSI) information transmission indicator) (on a PSSCH)
- MCS information
- TX power information
- L1 destination ID information and/or L1 source ID information
- SL HARQ process ID information
- NDI information
- RV information
- (Transmission traffic/packet related) QoS information (e.g., priority information)
- SL CSI-RS transmission indicator or information on the number of antenna ports for (transmitting) SL CSI-RS
- TX UE location information or location (or distance range) information of the target RX UE (for which SL HARQ feedback is requested)
- Reference signal (e.g., DM-RS, etc.) information related to decoding (and/or channel estimation) of data transmitted through a PSSCH. For example, information related to a pattern of (time-frequency) mapping resources of DM-RS(s), RANK information, antenna port index information, etc.

Meanwhile, in the present disclosure, for example, since the TX UE may transmit a SCI, a first SCI and/or a second SCI to the RX UE through a PSCCH, the PSCCH may be replaced/substituted with the SCI and/or the first SCI and/or the second SCI.

Additionally/alternatively, the SCI may be replaced/substituted with the PSCCH and/or the first SCI and/or the second SCI. Additionally/alternatively, for example, since the TX UE may transmit a second SCI to the RX UE through a PSSCH, the PSSCH may be replaced/substituted with the second SCI.

Meanwhile, in the present disclosure, for example, if SCI configuration fields are divided into two groups in consideration of a (relatively) high SCI payload size, the first SCI including a first SCI configuration field group may be referred to as a first SCI, and the second SCI including a second SCI configuration field group may be referred to as a second SCI. Also, for example, the first SCI may be transmitted to the receiving UE through a PSCCH. Also, for example, the second SCI may be transmitted to the receiving UE through a (independent) PSCCH or may be piggybacked and transmitted together with data through a PSSCH.

Meanwhile, in the present disclosure, for example, the term "configure/configured" or the term "define/defined" may refer to (pre)configuration from a base station or a network (through predefined signaling (e.g., SIB, MAC, RRC, etc.)) (for each resource pool).

Meanwhile, in the present disclosure, for example, since an RLF may be determined based on out-of-synch (OOS) indicator(s) or in-synch (IS) indicator(s), the RLF may be replaced/substituted with out-of-synch (OOS) indicator(s) or in-synch (IS) indicator(s).

Meanwhile, in the present disclosure, for example, an RB may be replaced/substituted with a subcarrier. Also, in the present disclosure, for example, a packet or a traffic may be replaced/substituted with a TB or a MAC PDU based on a transmission layer.

Meanwhile, in the present disclosure, a code block group (CBG) or a CG may be replaced/substituted with a TB.

Meanwhile, in the present disclosure, for example, a source ID may be replaced/substituted with a destination ID.

Meanwhile, in the present disclosure, for example, an L1 ID may be replaced/substituted with an L2 ID. For example, the L1 ID may be an L1 source ID or an L1 destination ID. For example, the L2 ID may be an L2 source ID or an L2 destination ID.

Meanwhile, in the present disclosure, for example, an operation of the transmitting UE to reserve/select/determine retransmission resource(s) may include: an operation of the transmitting UE to reserve/select/determine potential retransmission resource(s) for which actual use will be determined based on SL HARQ feedback information received from the receiving UE.

Meanwhile, in the present disclosure, SL mode 1 may refer to a resource allocation method or a communication method in which a base station directly schedules sidelink transmission (SL TX) resource(s) of a UE through predefined signaling (e.g., DCI). Also, for example, SL mode 2 may refer to a resource allocation method or a communication method in which a UE independently selects SL TX resource(s) within a resource pool configured or pre-configured from a base station or a network.

Meanwhile, in the present disclosure, for example, for convenience of description, a (physical) channel used when the RX UE transmits at least one of the following information to the TX UE may be referred to as a PSFCH.

SL HARQ Feedback, SL CSI, SL (L1) RSRP

Meanwhile, in NR sidelink, at least from the viewpoint of transmission of a UE in carrier(s), time division multiplexing (TDM) between a PSCCH/PSSCH and a physical sidelink feedback channel (PSFCH) is allowed for transmission of PSFCH format for sidelink in slots. In addition, in unicast sidelink communication, hybrid automatic repeat request (HARQ) feedback transmission of UE(s) may be supported. In addition, in groupcast sidelink communication, HARQ feedback transmission of UE(s) may be supported. That is, in the unicast sidelink communication or the groupcast sidelink communication, a receiving UE may transmit HARQ feedback corresponding to a PSCCH and/or a PSSCH received from a transmitting UE to the transmitting UE. Furthermore, when HARQ feedback is enabled for the groupcast sidelink communication, the HARQ feedback option 1 or the HARQ feedback option 2 may be supported.

According to the HARQ feedback option 1, a receiving UE may transmit only HARQ negative acknowledgement (NACK) to a transmitting UE. That is, the receiving UE may not transmit HARQ acknowledgement (ACK) to the transmitting UE. If the HARQ feedback option 1 is used for sidelink groupcast transmission, a plurality of receiving UEs (e.g., all receiving UEs or some receiving UEs in a group) may share a PSFCH resource to transmit HARQ feedback.

On the other hand, according to the HARQ feedback option 2, a receiving UE may transmit HARQ ACK or HARQ NACK to a transmitting UE. If the HARQ feedback option 2 is used for sidelink groupcast transmission, a plurality of receiving UEs (e.g., each receiving UEs in a group) transmits HARQ ACK or HARQ NACK by using separate PSFCH resources. For example, each of PSFCH resources may be mapped to a time resource, a frequency resource, and a code resource.

In slots associated with a resource pool, PSFCH resources may be periodically (pre-)configured with a period of N slots. For example, N may be a positive integer. For example, N may be 2 or 4.

Meanwhile, in NR sidelink, a sequence-based PSFCH format having one symbol may be supported. The one symbol does not include an automatic gain control (AGC) training period. The sequence-based PSFCH format having the one symbol may be applicable to HARQ feedback in unicast. In addition, the sequence-based PSFCH format having one symbol may be applicable to HARQ feedback in groupcast including the HARQ feedback option 1 and the HARQ feedback option 2. The sequence-based PSFCH format sequence having one symbol may be generated similarly to the sequence of a PUCCH format 0.

In the case of the HARQ feedback option 1 based on TX-RX distance-based HARQ feedback for groupcast, if the TX-RX distance is less than or equal to the communication range requirement, a receiving UE may transmit HARQ feedback for a PSSCH. Otherwise, the receiving UE may not transmit HARQ feedback for the PSSCH. For example, the location of the transmitting UE may be indicated by a SCI related to the PSSCH.

Meanwhile, for PSSCH transmission in the last symbol of slot n, HARQ feedback related to the PSSCH transmission is expected to be in slot n+a. Herein, a may be the smallest integer greater than or equal to K under the condition that slot n+a includes PSFCH resource(s). In addition, if at least a PSFCH in the slot is a response to a single PSSCH, the implicit mechanism may be used to determine at least a frequency domain resource and/or a code domain resource of the PSFCH within the configured resource pool.

Meanwhile, in case a base station allocates resource(s) for sidelink transmission to a transmitting UE, if the transmitting UE that has performed sidelink transmission through the resource(s) receives HARQ feedback for the sidelink transmission from a receiving UE, the transmitting UE needs to report information on the HARQ feedback to the base station.

For example, it is assumed that a base station allocates a first PSSCH and/or a first PSCCH for initial transmission to a transmitting UE and allocates a second PSSCH and/or a second PSCCH for sidelink HARQ feedback-based retransmission to the transmitting UE. In this case, the transmitting UE may transmit sidelink information to a receiving UE through the first PSSCH and/or the first PSCCH. In the present disclosure, the sidelink information may include at least one of sidelink data, sidelink control information, a sidelink service, or a sidelink packet. Thereafter, if the transmitting UE receives HARQ NACK from the receiving UE, the transmitting UE may report information on HARQ feedback related to the HARQ NACK to the base station through a PUCCH, and the transmitting UE may retransmit the sidelink information to the receiving UE through the second PSSCH and/or the second PSCCH. Thereafter, if the transmitting UE receives HARQ NACK from the receiving UE, the transmitting UE may report information on HARQ feedback related to the HARQ NACK to the base station through a PUCCH. In this case, the base station may allocate additional sidelink transmission resource(s) to the transmitting UE.

For example, it is assumed that a base station allocates a first PSSCH and/or a first PSCCH for initial transmission to a transmitting UE and allocates a second PSSCH and/or a second PSCCH for sidelink HARQ feedback-based retransmission to the transmitting UE. In this case, the transmitting UE may transmit sidelink information to a receiving UE through the first PSSCH and/or the first PSCCH. Thereafter, if the transmitting UE receives HARQ ACK from the receiving UE, the transmitting UE may report information on HARQ feedback related to the HARQ ACK to the base station through a PUCCH. In this case, it may be unnecessary for the transmitting UE to perform sidelink HARQ feedback-based retransmission through the second PSSCH and/or the second PSCCH. Accordingly, for example, the base station may allocate resource(s) related to the second PSSCH and/or the second PSCCH to another UE or may allocate it for uplink transmission of the transmitting UE.

As described above, in the case of LTE sidelink mode 1 or mode 3 operation, or in the case of NR sidelink mode 1 operation in which a base station allocates sidelink transmission resource(s) to UE(s), it may be necessary for a transmitting UE to report information on received HARQ feedback, in order for the base station to efficiently manage sidelink resource(s).

Meanwhile, for example, if NR sidelink resource allocation mode 1-based sidelink transmission and LTE-based sidelink transmission (e.g., mode 3-based LTE sidelink transmission or mode 4-based LTE sidelink transmission) are fully or partially overlapped in a time domain, a UE may drop the NR sidelink resource allocation mode 1-based sidelink transmission based on a predefined rule. For example, if NR sidelink resource allocation mode 1-based sidelink transmission and LTE-based sidelink transmission are fully or partially overlapped in the time domain, the UE may drop the NR sidelink resource allocation mode 1-based sidelink transmission based on a predefined priority-based transmission dropping rule. For example, the UE may determine not to perform NR sidelink resource allocation mode 1-based sidelink transmission based on a predefined rule.

Meanwhile, for example, if NR sidelink resource allocation mode 1-based sidelink transmission and LTE-based sidelink reception (e.g., mode 3-based LTE sidelink reception or mode 4-based LTE sidelink reception) are fully or partially overlapped in a time domain, a UE may drop the NR sidelink resource allocation mode 1-based sidelink transmission based on a predefined rule. For example, if NR sidelink resource allocation mode 1-based sidelink transmission and LTE-based sidelink reception are fully or partially overlapped in the time domain, the UE may drop the NR sidelink resource allocation mode 1-based sidelink transmission based on a predefined priority-based reception dropping rule. For example, the UE may determine not to perform NR sidelink resource allocation mode 1-based sidelink transmission based on a predefined rule.

In the present disclosure, for convenience of description, NR sidelink resource allocation mode 1-based sidelink transmission may be referred to as MODE 1 NR SL TX, and NR-based sidelink transmission may be referred to as NR SL TX, and NR-based sidelink reception may be referred to as NR SL RX. In the present disclosure, for convenience of description, LTE-based sidelink transmission may be referred to as LTE SL TX, and mode 3-based LTE sidelink transmission may be referred to as MODE 3 LTE SL TX, and mode 4-based LTE sidelink transmission may be referred to as MODE 4 LTE SL TX. In the present disclosure, for convenience of description, LTE-based sidelink reception may be referred to as LTE SL RX, and mode 3-based LTE sidelink reception may be referred to as MODE 3 LTE SL RX, and mode 4-based LTE sidelink reception may be referred to as MODE 4 LTE SL RX.

Herein, for example, if an NR base station does not know that the UE has dropped MODE 1 NR SL TX, the UE may not satisfy requirements (e.g., reliability) related to a packet/traffic for which the UE intends to transmit. For example, if the NR base station does not know that the UE has determined not to perform MODE 1 NR SL TX, the UE may not satisfy requirements (e.g., reliability) related to the packet/traffic for which the UE intends to transmit.

For example, it is assumed that the NR base station has allocated K transmission resources (e.g., NR MODE 1 transmission resources) (required to achieve related requirements) to the UE, based on information on a type of service(s) related to transmission packet(s)/traffic(s), information on QoS parameter(s), information on SL quality (e.g., SL CSI, SL reference signal received power (RSRP), reference signal received quality (RSRQ)), etc., reported from the UE. In this case, the UE may not actually perform MODE 1 NR SL TX by using some or all of K transmission resources based on a predefined rule. Specifically, for example, the UE may omit/drop MODE 1 NR SL TX on some or all of K transmission resources based on a predefined rule. Therefore, the UE may not finally satisfy QoS requirements related to transmission packet(s)/traffic(s). Further, for example, since the NR base station does not know (accurately) whether the UE omits/drops MODE 1 NR SL TX, the NR base station cannot allocate additional transmission resource(s) (e.g., additional transmission resource(s) corresponding to a resource in which SL TX is omitted/dropped or additional transmission resource(s) corresponding to the number of resources in which SL TX is omitted/dropped) to the UE. For example, since the NR base station does not know (accurately) whether the UE has determined not to perform MODE 1 NR SL TX, the NR base station cannot allocate additional transmission resource(s) to the UE. Therefore, the UE needs to report information related to MODE 1 NR SL TX to the base station. Hereinafter, based on an embodiment of the present disclosure, a method for the UE to report information related to sidelink transmission to the base station and an apparatus supporting the same will be described.

Figure 18:
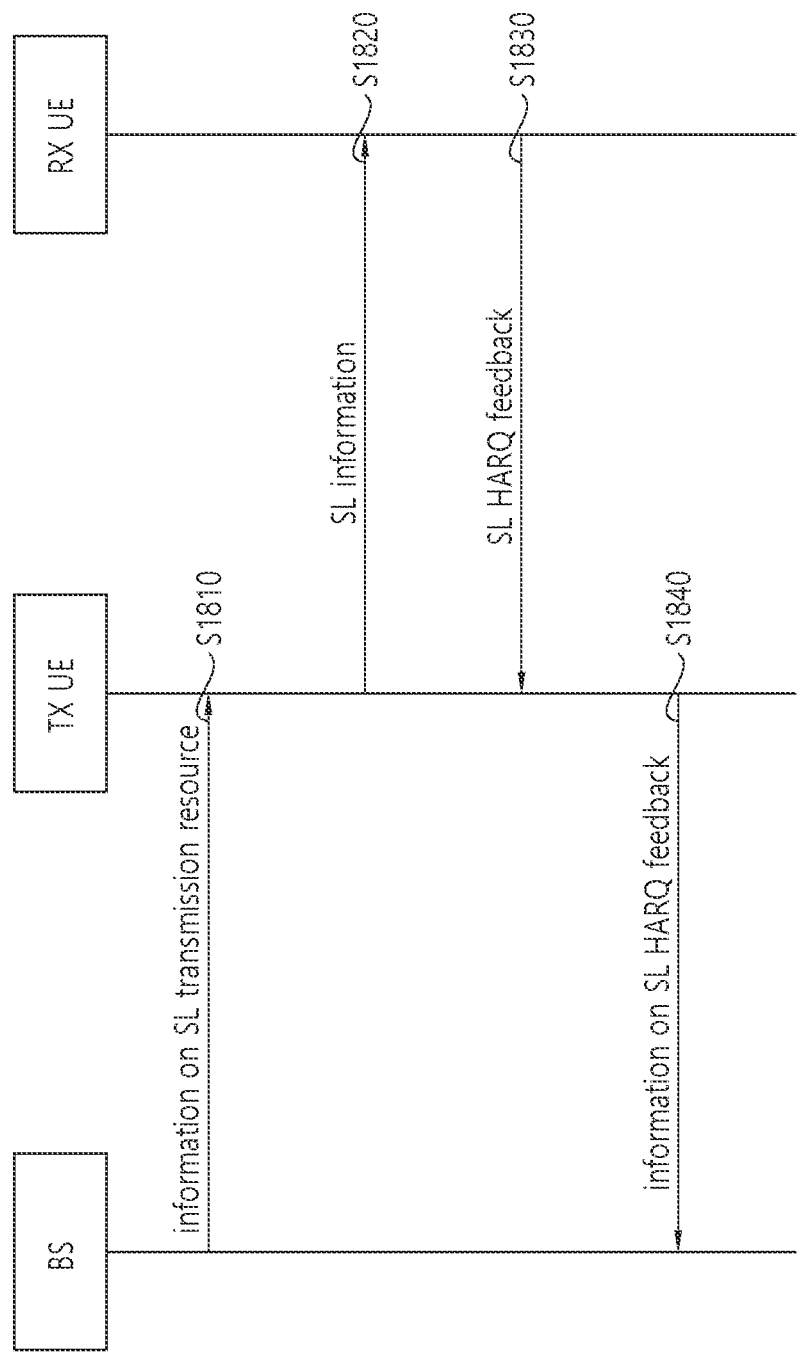
FIG. 18 is a diagram for explaining a problem in which transmission resources collide between UEs performing operations in different modes.

Meanwhile, for example, if a UE performing a sidelink mode 1 operation and a UE performing a sidelink mode 2 operation coexist within the same resource pool, under an example situation of FIG. 18, a transmission resource collision problem may occur between UEs operating in different modes. For example, the sidelink mode 1 may be the transmission mode 1 or the transmission mode 3 of LTE, and the sidelink mode 2 may be the transmission mode 2 or the transmission mode 4 of LTE. For example, the sidelink mode 1 may be the NR resource allocation mode 1, and the sidelink mode 2 may be the NR resource allocation mode 2.

FIG. 18 is a diagram for explaining a problem in which transmission resources collide between UEs performing operations in different modes. The embodiment of FIG. 18 may be combined with various embodiments of the present disclosure.

Referring to FIG. 18, in step S1810, the base station may transmit information on SL transmission resource(s) to the transmitting UE. For example, the transmitting UE may be a UE performing the sidelink mode 1 operation. For example, the base station may schedule and/or allocate the SL transmission resource(s) to the transmitting UE.

In step S1820, based on the information on the SL transmission resource(s), the transmitting UE may transmit sidelink information to the receiving UE. For example, the transmitting UE may transmit, to the receiving UE, (initial) sidelink information on a (initial) transmission resource scheduled and/or allocated by the base station. In the present disclosure, the sidelink information may include at least one of sidelink data, sidelink control information, a sidelink channel, a sidelink signal, a sidelink service, and/or a sidelink packet. For example, the sidelink information may be transmitted on a resource related to a PSSCH and/or a resource related to a PSCCH.

In step S1830, the transmitting UE may receive SL HARQ feedback from the receiving UE. For example, the SL HARQ feedback may be received corresponding to the sidelink information. In addition, in step S1840, the transmitting UE may report information on the SL HARQ feedback received from the receiving UE to the base station through a pre-configured resource (e.g., PUCCH).

Under the above situation, if the SL HARQ feedback received by the transmitting UE from the receiving UE is NACK and the transmitting UE reports NACK to the base station, the base station may additionally schedule and/or allocate resource(s) for retransmission to the transmitting UE operating in the sidelink mode 1. In this case, since the base station does not know information on transmission resource(s) (e.g., information on a time domain, information on a frequency domain, information on a period, etc.) selected and/or reserved by other transmitting UEs operating in the sidelink mode 2 in the same resource pool, the retransmission resource(s) scheduled and/or allocated by the base station to the transmitting UE operating in the sidelink mode 1 may partially or fully overlap with the transmission resource(s) selected and/or reserved by other transmitting UEs operating in the sidelink mode 2.

In addition, other transmitting UEs operating in the sidelink mode 2 in the same resource pool may be difficult to secure (sufficient) time to sense the retransmission resource(s) additionally or dynamically scheduled and/or allocated by the base station to the transmitting UE operating in the sidelink mode 1. Accordingly, other transmitting UEs operating in the sidelink mode 2 in the same resource pool may select and/or reserve transmission resource(s) partially or fully overlapping with the retransmission resource(s) scheduled and/or allocated by the base station to the transmitting UE operating in the sidelink mode 1.

On the other hand, if the SL HARQ feedback received by the transmitting UE from the receiving UE is ACK and the transmitting UE reports ACK to the base station, the base station may release the remaining retransmission resources (after the corresponding time) previously scheduled and/or allocated to the transmitting UE operating in the sidelink mode 1, or may use it for other purposes (e.g., UL or SL transmission resource(s) of other UEs).

In order to alleviate the above problem, it is necessary to propose a method for performing sidelink transmission by a transmitting UE operating in the sidelink mode 1. Hereinafter, based on an embodiment of the present disclosure, a method for performing sidelink transmission by the transmitting UE operating in the sidelink mode 1 and an apparatus supporting the same will be described. In the present disclosure, for convenience of description, a transmitting UE operating in the sidelink mode 1 may be referred to as a mode 1 transmitting UE, and a transmitting UE operating in the sidelink mode 2 may be referred to as a mode 2 transmitting UE.

Based on an embodiment of the present disclosure, based on whether a specific resource exists between transmission resources scheduled and/or allocated by the base station, the mode 1 transmitting UE may transmit sidelink information to the receiving UE on some transmission resources.

Figure 19:
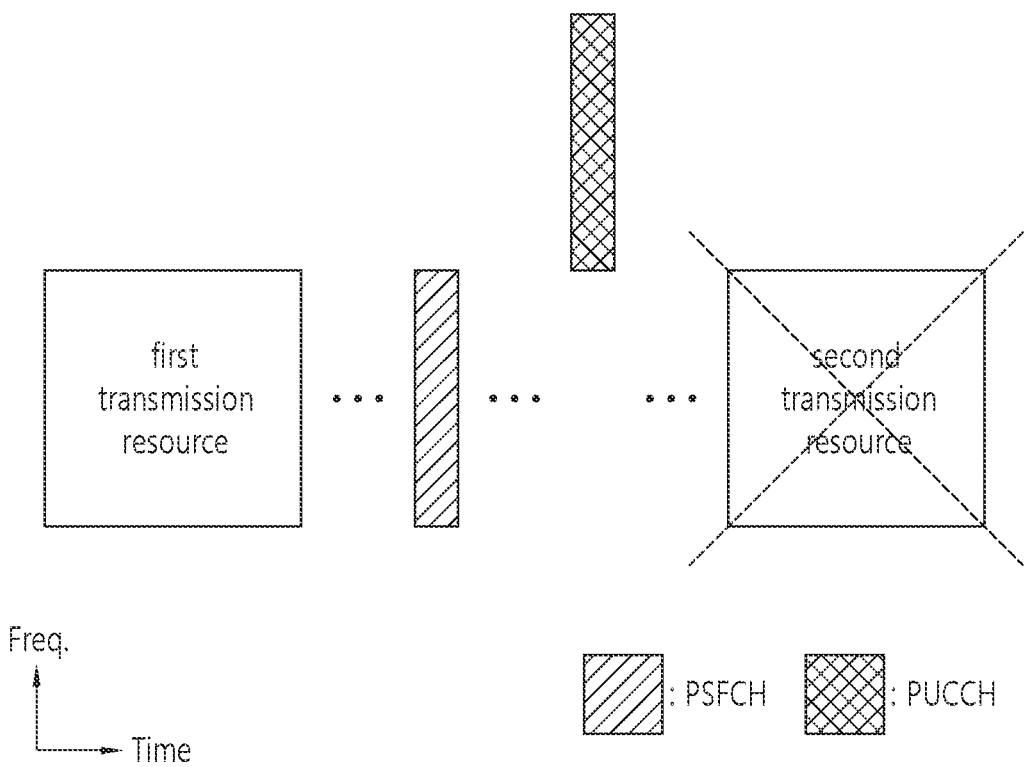
FIG. 19 shows a method for a mode 1 transmitting UE to perform sidelink transmission by using transmission resource(s) related to sidelink, based on an embodiment of the present disclosure.

FIG. 19 shows a method for a mode 1 transmitting UE to perform sidelink transmission by using transmission resource(s) related to sidelink, based on an embodiment of the present disclosure. The embodiment of FIG. 19 may be combined with various embodiments of the present disclosure.

Referring to FIG. 19, for example, the base station may schedule and/or allocate a first transmission resource and a second transmission resource to the transmitting UE. For example, the first transmission resource and the second transmission resource may be resources related to sidelink transmission of the transmitting UE. For example, the base station may schedule and/or allocate the first transmission resource and the second transmission resource to the transmitting UE through a sidelink grant and/or a sidelink DCI. In the embodiment of FIG. 19, it is assumed that the transmitting UE is a mode 1 transmitting UE.

For example, the base station may schedule and/or allocate a PUCCH resource to the transmitting UE. For example, the PUCCH resource may be a resource for the transmitting UE to report information on SL HARQ feedback received from the receiving UE to the base station.

For example, the base station may schedule and/or allocate a PSFCH resource to the transmitting UE and/or the receiving UE. The PSFCH resource may be a resource for the transmitting UE to receive SL HARQ feedback from the receiving UE.

Alternatively, for example, the transmitting UE and/or the receiving UE may determine a PSFCH resource based on implicit rules. For example, based on PSSCH and/or PSCCH related (transmission) parameters (e.g., an index of a slot related to a PSCCH and/or a PSSCH, an index of a sub-channel related to a PSCCH and/or a PSSCH, a source identity (ID), a destination ID, a local group ID, etc.), the receiving UE may determine the PSFCH resource used to transmit HARQ feedback to the transmitting UE. For example, if the base station allocates resource(s) related to sidelink transmission to the transmitting UE, the transmitting UE may receive PSSCH and/or PSCCH related (transmission) parameters (e.g., an index of a slot related to a PSCCH and/or a PSSCH, and/or an index of a sub-channel related to a PSCCH and/or a PSSCH) from the base station. For example, if the transmitting UE autonomously determines or selects resource(s) related to sidelink transmission, the transmitting UE may autonomously determine PSSCH and/or PSCCH related (transmission) parameters (e.g., an index of a slot related to a PSCCH and/or a PSSCH, and/or an index of a sub-channel related to a PSCCH and/or a PSSCH). For example, the source ID may be an identifier for identifying a transmitting side (e.g., the transmitting UE) of sidelink information in sidelink communication. For example, the destination ID may be an identifier for identifying a receiving side (e.g., the receiving UE) of sidelink information in sidelink communication. For example, the local group ID may be an identifier for identifying a group including UEs in groupcast sidelink communication. For example, the source ID, the destination ID, and/or the local group ID may be transmitted through a layer-2 (e.g., MAC layer). For example, the source ID, the destination ID, and/or the local group ID may be provided from a higher layer (e.g., an application layer) or derived from an ID provided by a higher layer.

As in the embodiment of FIG. 19, if the PUCCH resource and/or the PSFCH resource are located or exist between the first transmission resource and the second transmission resource, the transmitting UE may use only the first transmission resource (e.g., the first transmission resource scheduled and/or allocated based on a previous sidelink grant and/or a previous sidelink DCI) for transmission of sidelink information. Additionally/alternatively, the transmitting UE may use the second transmission resource to check whether the base station has successfully received information on SL HARQ feedback (e.g., NACK) reported to the base station by the transmitting UE. Additionally/alternatively, the transmitting UE may use the second transmission resource to check whether the base station schedules and/or allocates retransmission resource(s). For example, the transmitting UE may transmit sidelink information by using the first transmission resource, but may not transmit sidelink information by using the second transmission resource.

Herein, for example, a SCI transmitted by the transmitting UE on the first resource may include scheduling information for the second resource. Therefore, for example, the mode 2 transmitting UE which has successfully decoded the SCI transmitted on the first resource may know that the second transmission resource is a potential (re)transmission resource to be used by the transmitting UE. Accordingly, for example, the mode 2 transmitting UE may select and/or reserve resource(s) other than the second transmission resource.

Also, based on an embodiment of the present disclosure, the first transmission resource and/or the second transmission resource may include one or more transmission resources.

Based on an embodiment of the present disclosure, if the base station receives NACK information from the transmitting UE through the PUCCH resource between the first transmission resource and the second transmission resource, the base station may additionally schedule and/or allocate a third transmission resource and a fourth transmission resource to the transmitting UE.

Figure 20:
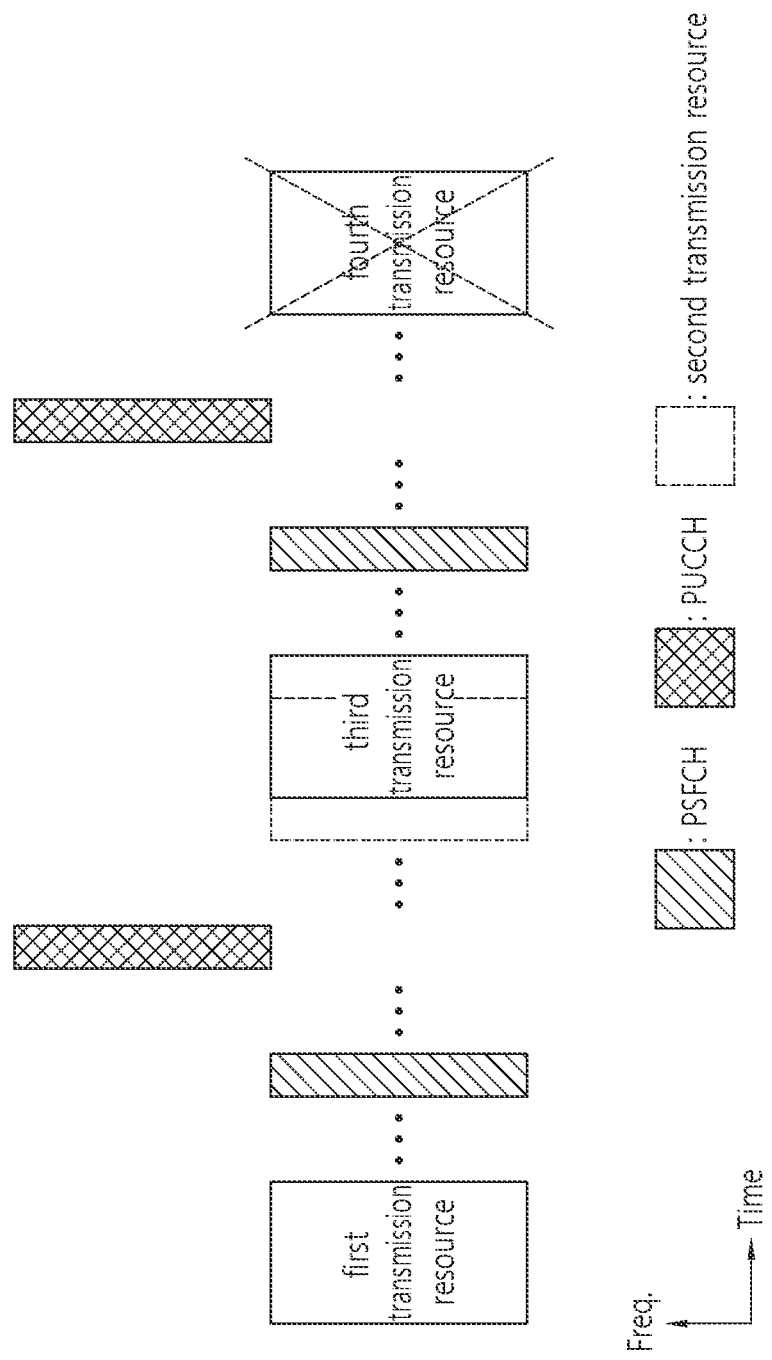
FIG. 20 shows a method for a base station to additionally schedule and/or allocate a third transmission resource and a fourth transmission resource to a transmitting UE, based on an embodiment of the present disclosure.

FIG. 20 shows a method for a base station to additionally schedule and/or allocate a third transmission resource and a fourth transmission resource to a transmitting UE, based on an embodiment of the present disclosure. The embodiment of FIG. 20 may be combined with various embodiments of the present disclosure.

Referring to FIG. 20, if the base station receives NACK information from the transmitting UE through the PUCCH resource between the first transmission resource and the second transmission resource, the base station may additionally schedule and/or allocate the third transmission resource and the fourth transmission resource to the transmitting UE. Herein, the second transmission resource and the third transmission resource may be fully or partially overlapping (location) resources. This is to alleviate the transmission resource collision problem between the transmitting UE (i.e., the mode 1 transmitting UE) and the mode 2 transmitting UE. Alternatively, although not shown in FIG. 20, the second transmission resource and the third transmission resource may be independent resources (in different locations).

Herein, for example, if a PUCCH resource and/or a PSFCH resource are located or exist between the third transmission resource and the fourth transmission resource, the transmitting UE may use only the third transmission resource for transmission of sidelink information. Additionally/alternatively, the transmitting UE may use the fourth transmission resource to check whether the base station has successfully received information on SL HARQ feedback (e.g., NACK) reported by the transmitting UE to the base station.

Additionally/alternatively, the transmitting UE may use the fourth transmission resource to check whether the base station schedules and/or allocates retransmission resource(s). For example, the transmitting UE may transmit sidelink information by using the third transmission resource, but may not transmit sidelink information by using the fourth transmission resource. Herein, for example, a SCI transmitted by the transmitting UE on the third resource may include scheduling information for the fourth resource.

Herein, for example, if the above rule is applied, the mode 2 transmitting UE which uses the same resource pool as the mode 1 transmitting UE can effectively perform sensing for transmission resource(s) (e.g., mode 1 transmission resource(s) scheduled and/or allocated by the base station). For example, the mode 2 transmitting UE which has successfully decoded the SCI transmitted on the third resource may know that the fourth transmission resource is a potential (re)transmission resource to be used by the mode 1 transmitting UE. Accordingly, for example, the mode 2 transmitting UE may select and/or reserve resource(s) other than the fourth transmission resource.

Based on an embodiment of the present disclosure, if a PUCCH resource and/or a PSFCH resource are not located or do not exist between transmission resources scheduled and/or allocated by the base station to the transmitting UE, the transmitting UE may transmit sidelink information by using all of the transmission resources. Alternatively, if a PUCCH resource and/or a PSFCH resource are not located or do not exist between transmission resources scheduled and/or allocated by the base station to the transmitting UE, the transmitting UE may transmit sidelink information by using only the pre-determined number of transmission resources and/or transmission resource(s) in a specific location among the transmission resources.

Based on an embodiment of the present disclosure, if the mode 1 transmitting UE and the mode 2 transmitting UE coexist in the same resource pool, collision of transmission resources can be minimized.

Figure 21:
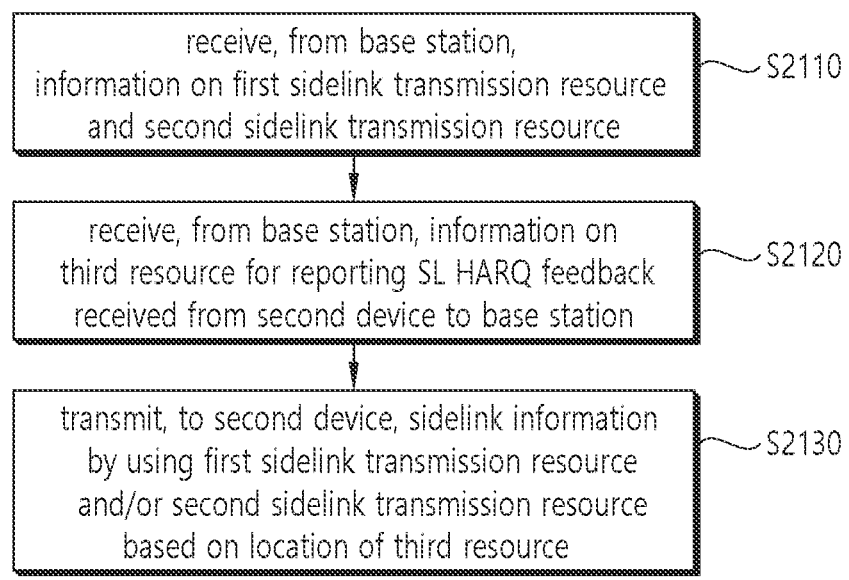
FIG. 21 shows a method for a first device to transmit sidelink information, based on an embodiment of the present disclosure.

FIG. 21 shows a method for a first device to transmit sidelink information, based on an embodiment of the present disclosure. The embodiment of FIG. 21 may be combined with various embodiments of the present disclosure.

Referring to FIG. 21, in step S2110, the first device may receive, from the base station, information on a first sidelink transmission resource and a second sidelink transmission resource. In step S2120, the first device may receive, from the base station, information on a third resource for reporting SL HARQ feedback received from the second device to the base station. In step S2130, the first device may transmit, to the second device, sidelink information by using the first sidelink transmission resource and/or the second sidelink transmission resource based on the location of the third resource. For example, if the third resource is located between the first sidelink transmission resource and the second sidelink transmission resource, the first device may transmit, to the second device, sidelink information by using the first sidelink transmission resource. In this case, the first device may not use the second sidelink transmission resource for sidelink transmission.

FIG. 22 shows a method for a second device to receive sidelink information, based on an embodiment of the present disclosure. The embodiment of FIG. 22 may be combined with various embodiments of the present disclosure.

Referring to FIG. 22, in step S2210, the second device may receive, from the first device, sidelink control information including information on a second resource on a first resource. For example, the second device may select and/or reserve resource(s) other than the second resource.

Figure 23:
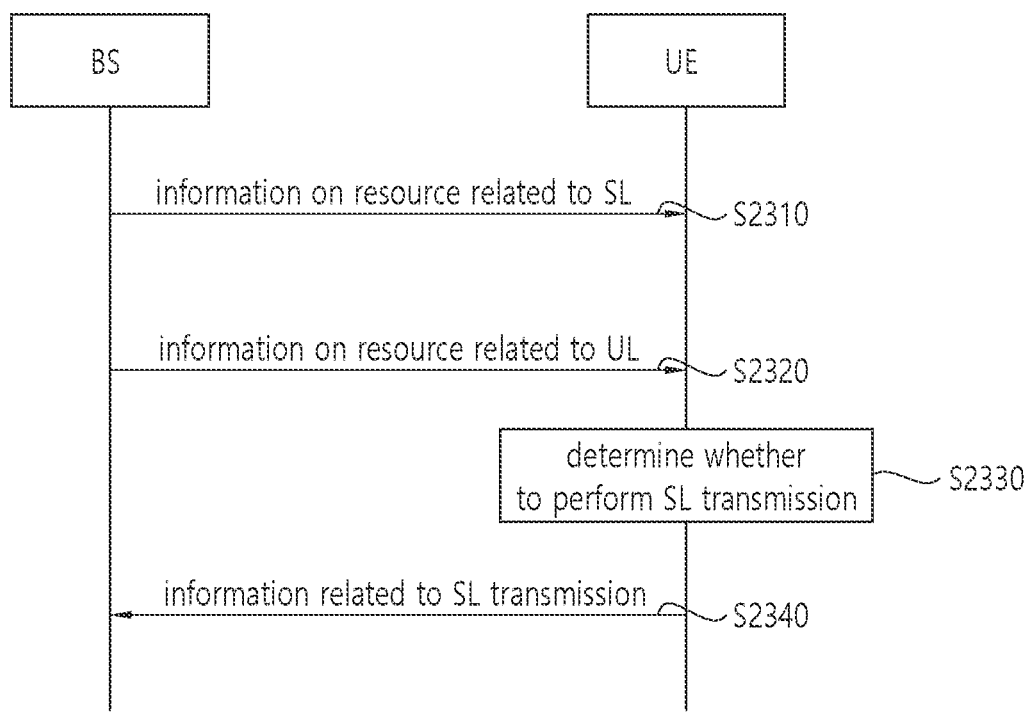
FIG. 23 shows a procedure in which a UE reports information related to sidelink transmission to a base station, based on an embodiment of the present disclosure.

FIG. 23 shows a procedure in which a UE reports information related to sidelink transmission to a base station, based on an embodiment of the present disclosure. The embodiment of FIG. 23 may be combined with various embodiments of the present disclosure.

Referring to FIG. 23, in step S2310, the base station may transmit information on resource(s) related to sidelink to the UE. For example, the base station may allocate resource(s) related to sidelink to the UE or may allocate resource(s) related to sidelink to the UE in advance. For example, the base station may allocate resource(s) related to sidelink to the UE through a SL DCI. For example, the resource(s) related to sidelink may include at least one of a resource related to a PSCCH and/or a resource related to a PSSCH. For example, the base station may be the NR base station or the gNB. For example, the UE may be a UE which performs sidelink communication based on NR sidelink resource allocation mode 1. For example, the UE may be a UE which performs sidelink communication based on LTE sidelink mode 3 or LTE sidelink mode 4. For example, the resource(s) related to sidelink may be physical resource(s) (e.g., PSCCH resource(s) and/or PSSCH resource(s)).

In step S2320, the base station may transmit information on a resource related to uplink to the UE. For example, the base station may allocate the resource related to uplink to the UE or may allocate the resource related to uplink to the UE in advance. For example, the resource related to uplink may be a resource for the UE to report information on whether MODE 1 NR SL TX is omitted/dropped to the base station. For example, the resource related to uplink may be a resource for reporting information on whether the UE determines not to perform MODE 1 NR SL TX to the base station. For example, the resource related to uplink may be a resource for reporting information on whether the UE performs MODE 1 NR SL TX to the base station. For example, the resource related to uplink may be a resource for the transmitting UE to report SL HARQ feedback information received from the receiving UE to the base station. For example, the resource related to uplink may be a resource related to resource(s) for MODE 1 NR SL TX of the UE. For example, the base station may allocate the resource related to uplink to the UE through the DCI. For example, the resource related to uplink may be a resource related to a PUCCH. For example, the resource related to uplink may be a physical resource (e.g., a PUCCH resource and/or a PUSCH resource).

In step S2330, the UE may determine whether to perform MODE 1 NR SL TX.

For example, if MODE 1 NR SL TX and LTE SL TX of the UE are overlapped partially or fully in a time domain, the UE may determine whether to perform MODE 1 NR SL TX on a resource related to the overlapped sidelink based on a predefined rule. For example, if MODE 1 NR SL TX and SL RX of the UE are overlapped partially or fully in a time domain, the UE may determine whether to perform MODE 1 NR SL TX on a resource related to the overlapped sidelink based on a predefined rule. In the present disclosure, for example, SL RX may be NR SL RX. In the present disclosure, for example, SL RX may be LTE SL RX, MODE 3 LTE SL RX or MODE 4 LTE SL RX.

For example, if MODE 1 NR SL TX and LTE SL TX of the UE on different carriers and/or different channels are overlapped partially or fully in a time domain, the UE may determine whether to perform MODE 1 NR SL TX based on a rule related to omission of transmission and/or omission of reception based on a predefined priority. For example, if MODE 1 NR SL TX and LTE SL TX of the UE are overlapped partially or fully in a time domain, the UE may determine not to perform MODE 1 NR SL TX on a resource related to the overlapped sidelink if a priority related to NR SL TX is lower than a priority related to LTE SL TX. For example, if MODE 1 NR SL TX and LTE SL TX of the UE are overlapped partially or fully in a time domain, the UE may determine not to perform MODE 1 NR SL TX on a resource related to the overlapped sidelink if a priority related to LTE SL TX is higher than a priority related to NR SL TX.

For example, if MODE 1 NR SL TX and SL RX of the UE on different carriers and/or different channels are overlapped partially or fully in a time domain, the UE may determine whether to perform MODE 1 NR SL TX based on a rule related to omission of transmission and/or omission of reception based on a predefined priority. For example, if MODE 1 NR SL TX and SL RX of the UE are overlapped partially or fully in a time domain, the UE may determine not to perform MODE 1 NR SL TX on a resource related to the overlapped sidelink if a priority related to NR SL TX is lower than a priority related to SL RX. For example, if MODE 1 NR SL TX and SL RX of the UE are overlapped partially or fully in a time domain, the UE may determine not to perform MODE 1 NR SL TX on a resource related to the overlapped sidelink if a priority related to SL RX is higher than a priority related to NR SL TX.

For example, the UE may determine prioritization between NR SL and LTE (i.e., E-UTRA) SL based on Table 5, and the UE may omit/drop either NR SL-related transmission/reception or LTE SL-related transmission/reception.

TABLE 5

Simultaneous NR and E-UTRA transmission/reception

If a UE
   would transmit a first channel/signal using E-UTRA radio access and a second
   channel/signal using NR radio access, and
   a transmission of the first channel/signal would overlap in time with a transmission of the
   second channel/signal, and
   the priorities of the two channels/signals are known to the UE T msec prior to the start of
   the earlier of the two transmissions
the UE transmits only the channel/signal with the higher priority as determined by the SCI formats
scheduling the transmissions or, in case of a S-SS/PSBCH block or a sidelink synchronization
signal using E-UTRA radio access, as indicated by higher layers or, in case of PSFCH, equal to the
priority of the corresponding PSSCH.
If a UE
   would respectively transmit or receive a first channel/signal using E-UTRA radio access and
   receive or transmit a second channel/signal using NR radio access, and
   a transmission or reception of the first channel/signal would respectively overlap in time with
   a reception or transmission of the second channel/signal, and
   the priorities of the two channels/signals are known to the UE T msec prior to the start of
   the earlier transmission or reception
the UE transmits or receives only the channel/signal with the higher priority as determined by the
SCI formats scheduling the transmissions or, in case of a S-SS/PSBCH block or a sidelink
synchronization signal using E-UTRA radio access, as indicated by higher layers or, in case of
PSFCH, equal to the priority of the corresponding PSSCH.

For example, if the UE simultaneously performs MODE 1 NR SL TX and UL TX on different carriers, the UE may reduce transmission power of MODE 1 NR SL TX based on a pre-configured rule. In this case, the UE may not perform MODE 1 NR SL TX by reducing the power allocated to MODE 1 NR SL TX to zero. For example, if the UE simultaneously performs SL TX and UL TX on the same carrier, the UE may not perform MODE 1 NR SL TX if SL TX and UL TX are overlapped in a time domain.

For example, the UE may determine prioritization between SL TX and UL TX based on Table 6.

TABLE 6

Prioritizations for sidelink and uplink transmissions

A UE performs prioritization between SL transmissions and UL transmissions.
PSFCH transmissions in a slot have a same priority value as the smallest priority value among
PSSCH receptions with corresponding HARQ-ACK information provided by the PSFCH
transmissions in the slot.
A priority of S-SS/PSBCH block transmission is provided by sl-SSB-PriorityNR.
For prioritization between PSFCH/S-SS/PSBCH block transmission and UL transmission other
than a PRACH, or a PUSCH scheduled by an UL grant in a RAR, or a PUCCH with sidelink
HARQ-ACK information report
   if the UL transmission is for a PUSCH or for a PUCCH with priority index 1,
     if sl-PriorityThresholdULURLLC is provided TABLE 6-continued Prioritizations for sidelink and uplink transmissions the SL transmission has higher priority than the UL transmission if a smallest priority
    value of the SL transmission(s) is smaller than sl-PriorityThresholdULURLLC;
    otherwise, the UL transmission has higher priority than the SL transmission
  else
    the UL transmission has higher priority than the SL transmission
  else
    the SL transmission has higher priority than the UL transmission if the smallest priority
    value of the SL transmission(s) is smaller than sl-PriorityThreshold; otherwise, the UL
    transmission has higher priority than the SL transmission
A PRACH transmission, or a PUSCH scheduled by an UL grant in a RAR, has higher priority than
a PSFCH or a S-SS/PSBCH block transmission.
A PUCCH transmission with a sidelink HARQ-ACK information report has higher priority than a
SL transmission if a priority value of the PUCCH is smaller than a priority value of the SL
transmission. If the priority value of the PUCCH transmission is larger than the priority value of the
SL transmission, the SL transmission has higher priority.
When one or more SL transmissions from a UE overlap in time with multiple non-overlapping UL
transmissions from the UE, the UE performs the SL transmissions if at least one SL transmission is
prioritized over all UL transmissions subject to the UE processing timeline with respect to the first
SL transmission and the first UL transmission.
When one or more UL transmissions from a UE overlap in time with multiple non-overlapping SL
transmissions, the UE performs the UL transmissions if at least one UL transmission is prioritized
over all SL transmissions subject to the UE processing timeline with respect to the first SL
transmission and the first UL transmission.
When one SL transmission overlaps in time with one or more overlapping UL transmissions, the
UE performs the SL transmission if the SL transmission is prioritized over all UL transmissions
subject to both the UE multiplexing and processing timelines with respect to the first SL
transmission and the first UL transmission, where the UE processing timeline with respect to the
first SL transmission and the first UL transmission is same as when one or more SL transmissions
overlap in time with multiple non-overlappmg UL transmissions.
When one SL transmission overlaps in time with one or more overlapping UL transmissions, the
UE performs the UL transmission if at least one UL transmission is prioritized over the SL
transmission subject to both the UE multiplexing and processing timelines with respect to the first
SL transmission and the first UL transmission, where the UE processing timeline with respect to
the first SL transmission and the first UL transmission is same as when one or more SL
transmissions overlap in time with multiple non-overlapping UL transmissions.

In addition, for example, the UE may perform either SL TX or UL TX based on Table 7 based on the determined priority. That is, the UE may omit/drop either SL TX or UL TX based on Table 7 based on the determined priority.

TABLE 7

Simultaneous SL and UL transmissions

If a UE
  would simultaneously transmit on the UL and on the SL of a serving cell, and
  the UE is not capable of simultaneous transmissions on the UL and on the SL of the serving
  cell
the UE transmits only on the link, UL or SL, with the higher priority.
If a UE
  is capable of simultaneous transmissions on the UL and on the SL of two respective carriers
  of a serving cell, or of two respective serving cells,
  would transmit on the UL and on the SL of the two respective carriers of the serving cell, or
  of the two respective serving cells,
  the transmission on the UL would overlap with the transmission on the SL over a time
  period, and
  the total UE transmission power over the time period would exceed $P_{CMAX}$
the UE
  reduces the power for the UL transmission prior to the start of the UL transmission, if the SL
  transmission has higher priority than the UL transmission as determined in table 6, so that
  the total UE transmission power would not exceed $P_{CMAX}$
  reduces the power for the SL transmission prior to the start of the SL transmission, if the UL
  transmission has higher priority than the SL transmission as determined in table 6, so that the
  total UE transmission power would not exceed $P_{CMAX}$ In the embodiment of FIG. 23, it is assumed that the UE determines not to perform MODE 1 NR SL TX. That is, it is assumed that the UE omits/drops MODE 1 NR SL TX.

In step S2340, the UE may transmit information related to sidelink transmission to the base station. For example, the information related to sidelink transmission may be transmitted in the resource related to uplink allocated by the base station. For example, if the UE omits/drops MODE 1 NR SL TX in some or all of the resource(s) related to sidelink allocated by the base station to the UE, the UE may transmit the information related to sidelink transmission to the base station in the resource related to uplink. For example, the resource related to uplink may be a resource related to transmission resource(s) in which the UE omits/drops transmission.

For example, the information related to sidelink transmission may be pre-configured information. For example, the information related to sidelink transmission may be NACK information. For example, the information related to sidelink transmission may be NACK information informing the base station that the UE does not perform MODE 1 NR SL TX. For example, the information related to sidelink transmission may be NACK information informing the base station that the UE omits/drops MODE 1 NR SL TX. For example, the information related to sidelink transmission may be a pre-configured status bit or an indication. For example, the information related to sidelink transmission may be a status bit or an indication informing that the UE does not perform MODE 1 NR SL TX. For example, the information related to sidelink transmission may be a status bit or an indication informing that the UE omits/drops MODE 1 NR SL TX.

Additionally, for example, the base station may configure the UE to report the information related to sidelink transmission to the base station through the resource related to uplink allocated by the base station in advance if the UE omits/drops MODE 1 NR SL TX.

Herein, for example, if the above-described rule(s) is applied, it may be advantageous for common or similar operations/procedures to be applied, compared with a case where the operation in which the transmitting UE reports SL HARQ feedback information (received from the receiving UE) to the base station through the PUCCH resource (hereinafter, SLHQ_PUCCH operation) is configured for the transmitting UE. In other words, for example, if the SLHQ_PUCCH operation is configured for the UE, and the UE omits/drops MODE 1 NR SL TX due to the above-described problem, the UE may report the information related to sidelink transmission (e.g., NACK information, status bit or indication) to the base station through the PUCCH resource configured for reporting SL HARQ feedback information. For example, if the SLHQ_PUCCH operation is configured for the transmitting UE, and the transmitting UE omits/drops MODE 1 NR SL TX due to the above-described problem, the UE may report the information related to sidelink transmission (e.g., NACK information, status bit or indication) to the base station through the PUCCH resource configured for reporting SL HARQ feedback information although the transmitting UE has not (actually) performed (data-related) PSSCH transmission and/or PSCCH transmission to the receiving UE.

Herein, for example, in order for the transmitting UE to report the information related to sidelink transmission to the base station, the transmitting UE may follow some operations of a specific procedure or use some operations of a specific procedure. For example, the base station may interpret/consider A) the operation in which the transmitting UE i) transmits (data-related) PSSCH and/or PSCCH to the receiving UE, and ii) receives NACK information from the receiving UE in response to the transmitted (data-related) PSSCH and/or PSCCH, and iii) reports the received NACK information to the base station through the PUCCH resource (for an additional retransmission resource allocation request) configured by the base station and (B) the operation in which the transmitting UE i) does not transmit (data-related) PSSCH and/or PSCCH for the above reasons, and ii) generates NACK information and reports it to the base station through the PUCCH resource configured by the base station, equally. For example, the base station may interpret/consider (A) the operation in which the transmitting UE reports NACK information or discontinuous detection (DTX) information to the base station through the PUCCH resource (for an additional retransmission resource allocation request) configured by the base station when the transmitting UE does not receive SL HARQ feedback information from the receiving UE although the transmitting UE has actually performed (data-related) PSSCH transmission and/or PSCCH transmission to the receiving UE and (B) the operation in which the transmitting UE i) does not transmit (data-related) PSSCH and/or PSCCH for the above reasons, and ii) generates NACK information and reports it to the base station through the PUCCH resource configured by the base station, equally.

Herein, for example, the rule(s) described above may be limitedly applied only if the UE is configured to simultaneously perform MODE 1 NR SL TX and LTE SL TX (e.g., MODE 3 LTE SL TX or MODE 4 LTE SL TX). Additionally/alternatively, for example, the rule(s) described above may be limitedly applied only if the UE is configured to simultaneously perform MODE 1 NR SL TX and RX. In addition, the UE (e.g., a UE performing sidelink transmission based on NR MODE 1) may be configured to report information on whether the corresponding (simultaneous) operation is performed to the base station through pre-configured signaling (e.g., physical layer signaling or higher layer signaling).

Figure 24:
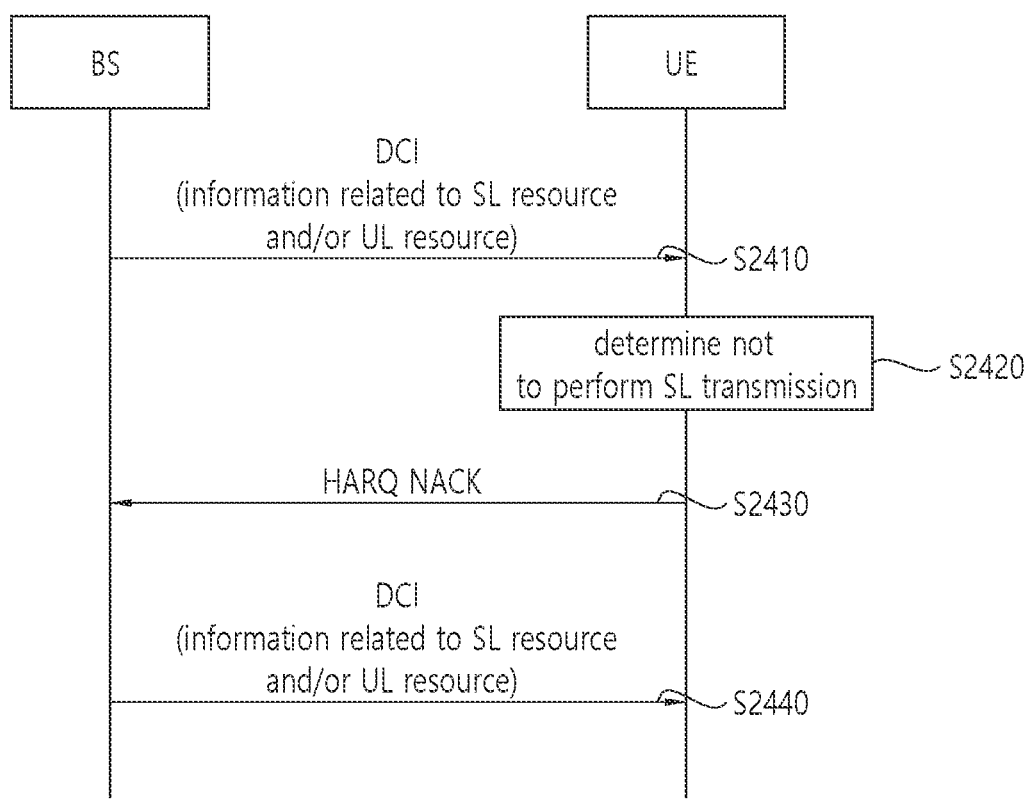
FIG. 24 shows a procedure for a UE to report NACK information to a base station, based on an embodiment of the present disclosure.

FIG. 24 shows a procedure for a UE to report NACK information to a base station, based on an embodiment of the present disclosure. The embodiment of FIG. 24 may be combined with various embodiments of the present disclosure.

Referring to FIG. 24, in step S2410, the base station may transmit a DCI including information related to SL resource(s) and/or information related to a UL resource to the UE through a PDCCH. For example, the SL resource(s) may include PSCCH resource(s) and/or PSSCH resource(s). For example, the UL resource may include a PUCCH resource and/or a PUSCH resource. For example, the DCI may be a DCI for allocating/scheduling resource(s) related to a dynamic grant.

In step S2420, the UE may determine not to perform SL transmission. For example, the UE may determine not to perform SL transmission on the SL resource(s) based on various embodiments of the present disclosure.

In step S2430, if the UE determines not to perform SL transmission on the SL resource(s), the UE may generate NACK information. In addition, the UE may transmit NACK information to the base station on the UL resource.

In step S2440, in response to the NACK information, the base station may transmit a DCI including information related to SL resource(s) and/or information related to a UL resource to the UE through a PDCCH. For example, the DCI may be a DCI for allocating/scheduling resource(s) related to a dynamic grant.

Figure 25:
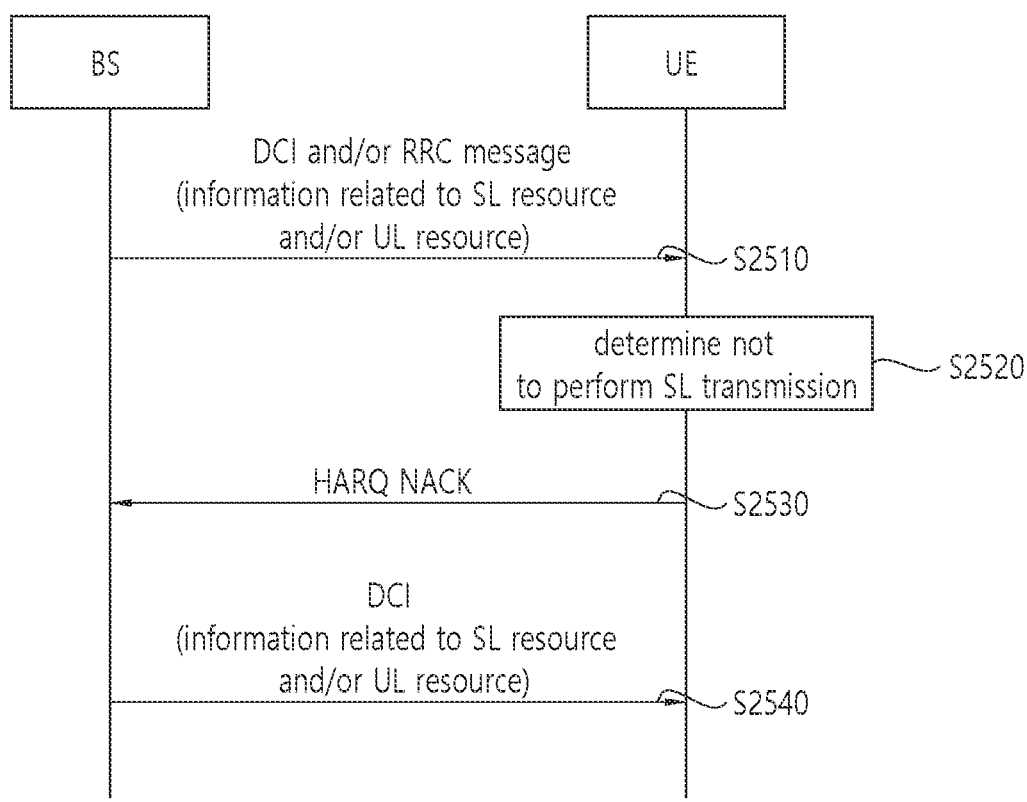
FIG. 25 shows a procedure for a UE to report NACK information to a base station, based on an embodiment of the present disclosure.

FIG. 25 shows a procedure for a UE to report NACK information to a base station, based on an embodiment of the present disclosure. The embodiment of FIG. 25 may be combined with various embodiments of the present disclosure.

Referring to FIG. 25, in step S2510, the base station may transmit an RRC message including information related to SL resource(s) and/or information related to a UL resource to the UE. Alternatively, the base station may transmit an RRC message including information related to SL resource(s) and/or information related to a UL resource to the UE, and the base station may transmit a DCI for activating or deactivating the resource(s) to the UE. For example, the resource(s) may be periodic resource(s). For example, the resource(s) may be resource(s) related to a configured grant.

Figure 26:
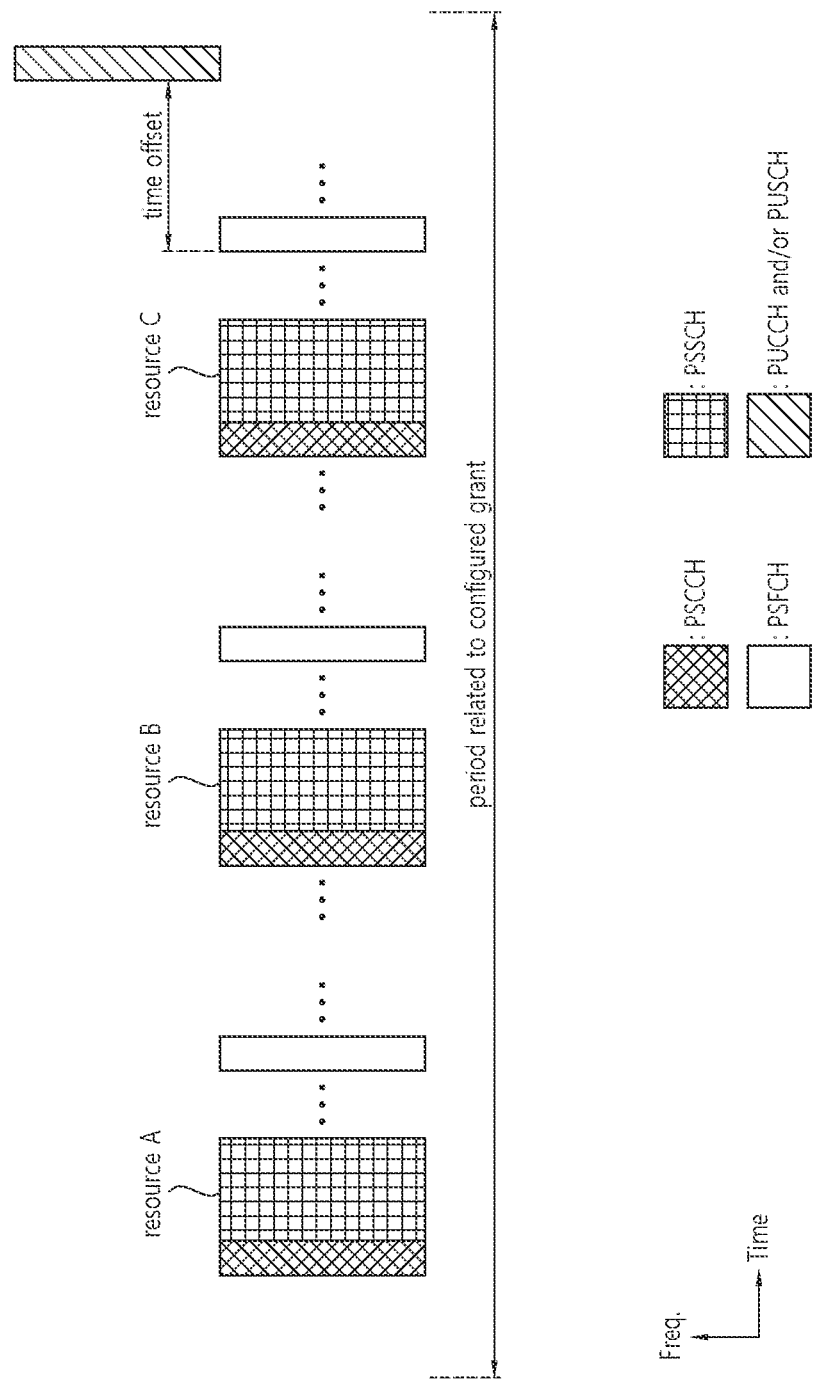
FIG. 26 shows an example of resources related to a configured grant, based on an embodiment of the present disclosure.

FIG. 26 shows an example of resources related to a configured grant, based on an embodiment of the present disclosure. The embodiment of FIG. 26 may be combined with various embodiments of the present disclosure.

Referring to FIG. 26, one or more SL resources may be allocated to the UE within one period. In addition, the one or more SL resources may be periodically repeated.

Referring back to FIG. 25, in step S2520, the UE may determine not to perform SL transmission. For example, based on various embodiments of the present disclosure, the UE may determine not to perform SL transmission on the one or more SL resources. For example, the UE may determine not to perform SL transmission within the period of FIG. 26. For example, the UE may determine not to perform SL transmission on the resource A, the resource B, and the resource C of FIG. 26.

In step S2530, if the UE determines not to perform SL transmission on the SL resource(s), the UE may generate NACK information. In addition, the UE may transmit NACK information to the base station on the UL resource. For example, the UL resource may be a PUCCH resource and/or a PUSCH resource. For example, the UL resource may be located after a time offset from a PSFCH resource related to the last PSSCH resource within the period of FIG. 26. For example, the UE may receive information related to the time offset from the base station.

In step S2540, in response to the NACK information, the base station may transmit a DCI including information related to SL resource(s) and/or information related to a UL resource to the UE through a PDCCH. For example, the DCI may be a DCI for allocating/scheduling resource(s) related to a dynamic grant.

Based on various embodiments of the present disclosure, the UE may report information on whether MODE 1 NR SL TX is performed to the base station. Therefore, the base station can know whether the UE omits/drops MODE 1 NR SL TX, for example, the base station can allocate additional transmission resource(s) to the UE. Accordingly, the UE can perform efficient sidelink transmission.

Figure 27:
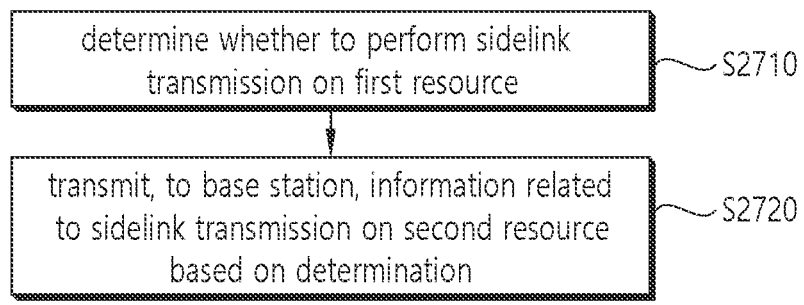
FIG. 27 shows a method for a first device to determine whether to perform sidelink transmission on a first resource, based on an embodiment of the present disclosure.

FIG. 27 shows a method for a first device to determine whether to perform sidelink transmission on a first resource, based on an embodiment of the present disclosure. The embodiment of FIG. 27 may be combined with various embodiments of the present disclosure.

Referring to FIG. 27, in step S2710, the first device may determine whether to perform sidelink transmission on the first resource. Herein, the first resource may include a resource related to a PSCCH and/or a resource related to a PSSCH. For example, the base station may allocate the first resource to the first device through a sidelink DCI. In step S2720, the first device may transmit, to the base station, information related to sidelink transmission on a second resource based on the determination. Herein, the information related to sidelink transmission may include information indicating/representing that sidelink transmission is not performed. For example, the information related to sidelink transmission may include NACK information, a pre-configured status bit, and/or a pre-configured indication. Herein, the second resource may include a resource related to a PUCCH. For example, the base station may allocate the second resource to the first device through the DCI.

FIG. 28 shows a method for a base station to receive information related to sidelink information from a first device on a second resource, based on an embodiment of the present disclosure. The embodiment of FIG. 28 may be combined with various embodiments of the present disclosure.

Referring to FIG. 28, in step S2810, the base station may receive, from the first device, information related to sidelink transmission on the second resource. For example, the base station may allocate a first resource to the first device through a sidelink DCI. Herein, the first resource may include a resource related to a PSCCH and/or a resource related to a PSSCH. Herein, the information related to sidelink transmission may include information indicating/representing that sidelink transmission is not performed. For example, the information related to sidelink transmission may include NACK information, a pre-configured status bit, and/or a pre-configured indication. Herein, the second resource may include a resource related to a PUCCH. For example, the base station may allocate the second resource to the first device through the DCI. For example, the base station may additionally allocate resource(s) to the first device based on the information related to sidelink transmission.

Figure 29:
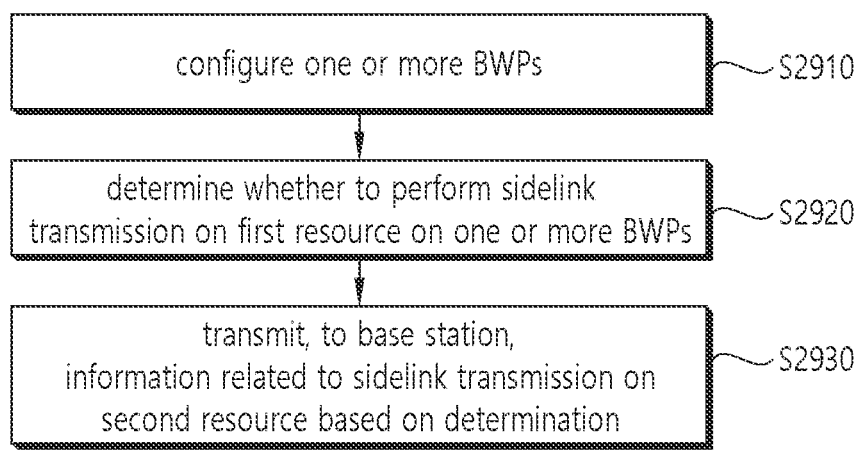
FIG. 29 shows a method for a first device to determine whether to perform sidelink transmission on a first resource on one or more BWPs, based on an embodiment of the present disclosure.

FIG. 29 shows a method for a first device to determine whether to perform sidelink transmission on a first resource on one or more BWPs, based on an embodiment of the present disclosure. The embodiment of FIG. 29 may be combined with various embodiments of the present disclosure.

Referring to FIG. 29, in step S2910, the first device may configure one or more BWPs. In step S2920, the first device may determine whether to perform sidelink transmission on the first resource on one or more BWPs. Herein, the first resource may include a resource related to a PSCCH and/or a resource related to a PSSCH. For example, the base station may allocate the first resource to the first device through a sidelink DCI. In step S2930, the first device may transmit, to the base station, information related to sidelink transmission on a second resource based on the determination. Herein, the information related to sidelink transmission may include information indicating/representing that sidelink transmission is not performed. For example, the information related to sidelink transmission may include NACK information, a pre-configured status bit, and/or a pre-configured indication. Herein, the second resource may include a resource related to a PUCCH. For example, the base station may allocate the second resource to the first device through the DCI.

Figure 30:
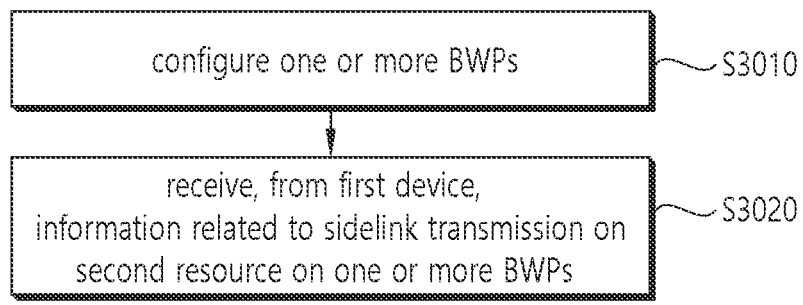
FIG. 30 shows a method for a base station to receive information related to sidelink information from a first device on a second resource on one or more BWPs, based on an embodiment of the present disclosure.

FIG. 30 shows a method for a base station to receive information related to sidelink information from a first device on a second resource on one or more BWPs, based on an embodiment of the present disclosure. The embodiment of FIG. 30 may be combined with various embodiments of the present disclosure.

Referring to FIG. 30, in step S3010, the base station may configure one or more BWPs. In step S3020, the base station may receive, from the first device, information related to sidelink transmission on the second resource on one or more BWPs. For example, the base station may allocate a first resource to the first device through a sidelink DCI. Herein, the first resource may include a resource related to a PSCCH and/or a resource related to a PSSCH. Herein, the information related to sidelink transmission may include information indicating/representing that sidelink transmission is not performed. For example, the information related to sidelink transmission may include NACK information, a pre-configured status bit, and/or a pre-configured indication. Herein, the second resource may include a resource related to a PUCCH. For example, the base station may allocate the second resource to the first device through the DCI. For example, the base station may additionally allocate resource(s) to the first device based on the information related to sidelink transmission.

Figure 31:
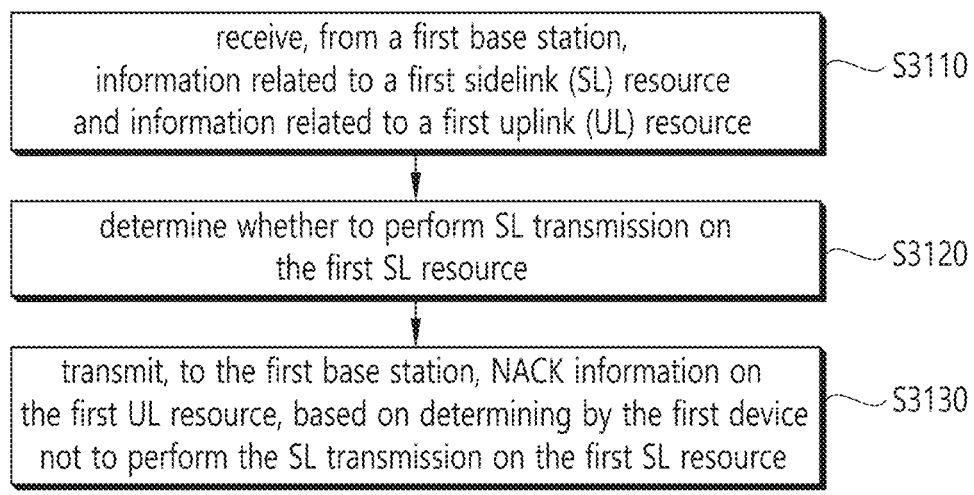
FIG. 31 shows a method for a first device to perform wireless communication, based on an embodiment of the present disclosure.

FIG. 31 shows a method for a first device to perform wireless communication, based on an embodiment of the present disclosure. The embodiment of FIG. 31 may be combined with various embodiments of the present disclosure.

Referring to FIG. 31, in step S3110, the first device may receive, from a first base station, information related to a first sidelink (SL) resource and information related to a first uplink (UL) resource. In step S3120, the first device may determine whether to perform SL transmission on the first SL resource. In step S3130, the first device may transmit, to the first base station, NACK information on the first UL resource, based on determining by the first device not to perform the SL transmission on the first SL resource.

For example, the first device may determine whether to perform the SL transmission on the first SL resource, based on a priority related to the SL transmission on the first SL resource. For example, the information related to the first SL resource and the information related to the first UL resource may be included in a downlink control information (DCI) or a radio resource control (RRC) message received from the first base station. For example, the first SL resource may be one or more SL resources allocated by a dynamic grant, and the SL transmission may not be performed on the one or more SL resources, and the first UL resource may be a UL resource related to the one or more SL resources. For example, the first SL resource may be one or more SL resources within one transmission period allocated by a configured grant, and the SL transmission may not be performed on the one or more SL resources within the one transmission period, and the first UL resource may be a UL resource related to the one or more SL resources within the one transmission period.

For example, the first SL resource and a second SL resource may be overlapped in a time domain, and the first SL resource may be a resource related to NR-based SL transmission, and the second SL resource may be a resource related to evolved universal terrestrial radio access (E-UTRA)-based SL communication. Herein, the first device may determine not to perform the SL transmission on the first SL resource, based on a priority related to the E-UTRA-based SL communication being higher than a priority related to the NR-based SL transmission. Additionally, for example, the first device may select the second SL resource based on sensing. Additionally, for example, the first device may receive, from a second base station, information related to the second SL resource. Herein, the first base station may be an NR-based base station, and the second base station may be an E-UTRA-based base station.

For example, the first device may determine not to perform the SL transmission on the first SL resource, based on the first SL resource and a second UL resource being overlapped in a time domain. For example, the first SL resource and a plurality of second UL resources may be overlapped in a time domain, and the first device may determine not to perform the SL transmission on the first SL resource, based on at least one of a plurality of priorities related to a plurality of UL transmissions on the plurality of second UL resources being higher than a priority related to the SL transmission on the first SL resource.

Additionally, for example, the first device may receive, from the first base station through a physical downlink control channel (PDCCH), a downlink control information (DCI) including information related to a third SL resource and information related to a third UL resource, in response to the NACK information. Additionally, for example, the first device may transmit, to a second device, a physical sidelink control channel (PSCCH) and a physical sidelink shared channel (PSSCH) on the third SL resource. Additionally, for example, the first device may receive, from the second device, hybrid automatic repeat request (HARQ) feedback on a physical sidelink feedback channel (PSFCH) resource related to the PSSCH. Additionally, for example, the first device may transmit, to the first base station, the HARQ feedback on the third UL resource.

For example, the SL transmission may include at least one of physical sidelink control channel (PSCCH) transmission and physical sidelink shared channel (PSSCH) transmission, and the first UL resource may include at least one of a physical uplink control channel (PUCCH) resource and a physical uplink shared channel (PUSCH) resource.

Additionally, for example, the first device may generate the NACK information based on determining by the first device not to perform the SL transmission on the first SL resource.

The proposed method can be applied to the device(s) described in the present disclosure. First, the processor 102 of the first device 100 may control the transceiver 106 to receive, from a first base station, information related to a first sidelink (SL) resource and information related to a first uplink (UL) resource. In addition, the processor 102 of the first device 100 may determine whether to perform SL transmission on the first SL resource. In addition, the processor 102 of the first device 100 may control the transceiver 106 to transmit, to the first base station, NACK information on the first UL resource, based on determining by the first device not to perform the SL transmission on the first SL resource.

Based on an embodiment of the present disclosure, a first device configured to perform wireless communication may be provided. For example, the first device may comprise: one or more memories storing instructions; one or more transceivers; and one or more processors connected to the one or more memories and the one or more transceivers. For example, the one or more processors may execute the instructions to: receive, from a first base station, information related to a first sidelink (SL) resource and information related to a first uplink (UL) resource; determine whether to perform SL transmission on the first SL resource; and transmit, to the first base station, NACK information on the first UL resource, based on determining by the first device not to perform the SL transmission on the first SL resource.

Based on an embodiment of the present disclosure, an apparatus configured to control a first user equipment (UE) performing wireless communication may be provided. For example, the apparatus may comprise: one or more processors; and one or more memories operably connected to the one or more processors and storing instructions. For example, the one or more processors may execute the instructions to: receive, from a first base station, information related to a first sidelink (SL) resource and information related to a first uplink (UL) resource; determine whether to perform SL transmission on the first SL resource; and transmit, to the first base station, NACK information on the first UL resource, based on determining by the first UE not to perform the SL transmission on the first SL resource.

Based on an embodiment of the present disclosure, a non-transitory computer-readable storage medium storing instructions may be provided. For example, the instructions, when executed, may cause a first device to: receive, from a first base station, information related to a first sidelink (SL) resource and information related to a first uplink (UL) resource; determine whether to perform SL transmission on the first SL resource; and transmit, to the first base station, NACK information on the first UL resource, based on determining by the first device not to perform the SL transmission on the first SL resource.

Figure 32:
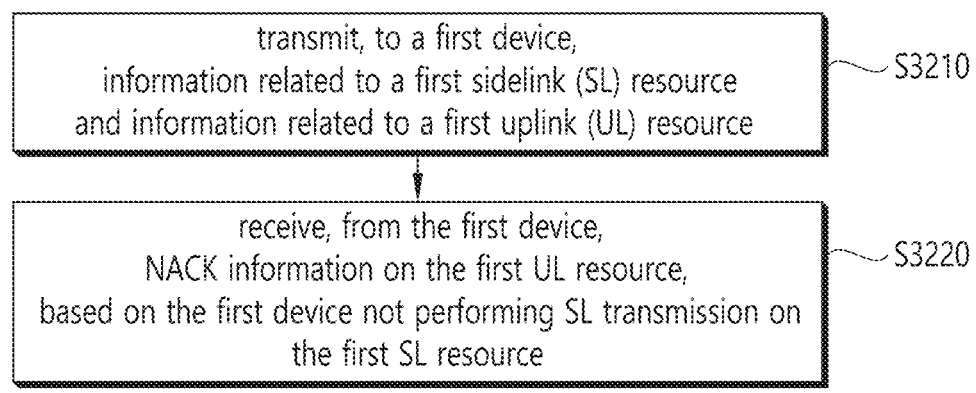
FIG. 32 shows a method for a base station to perform wireless communication, based on an embodiment of the present disclosure.

FIG. 32 shows a method for a base station to perform wireless communication, based on an embodiment of the present disclosure. The embodiment of FIG. 32 may be combined with various embodiments of the present disclosure.

Referring to FIG. 32, in step S3210, the base station may transmit, to a first device, information related to a first sidelink (SL) resource and information related to a first uplink (UL) resource. In step S3220, the base station may receive, from the first device, NACK information on the first UL resource, based on the first device not performing SL transmission on the first SL resource.

The proposed method can be applied to the device(s) described in the present disclosure. First, the processor 202 of the base station 200 may control the transceiver 206 to transmit, to a first device, information related to a first sidelink (SL) resource and information related to a first uplink (UL) resource. In addition, the processor 202 of the base station 200 may control the transceiver 206 to receive, from the first device, NACK information on the first UL resource, based on the first device not performing SL transmission on the first SL resource.

Based on an embodiment of the present disclosure, a base station configured to perform wireless communication may be provided. For example, the base station may comprise: one or more memories storing instructions; one or more transceivers; and one or more processors connected to the one or more memories and the one or more transceivers. For example, the one or more processors may execute the instructions to: transmit, to a first device, information related to a first sidelink (SL) resource and information related to a first uplink (UL) resource; and receive, from the first device, NACK information on the first UL resource, based on the first device not performing SL transmission on the first SL resource.

Based on an embodiment of the present disclosure, an apparatus configured to control a base station performing wireless communication may be provided. For example, the apparatus may comprise: one or more processors; and one or more memories operably connected to the one or more processors and storing instructions. For example, the one or more processors may execute the instructions to: transmit, to a first user equipment (UE), information related to a first sidelink (SL) resource and information related to a first uplink (UL) resource; and receive, from the first UE, NACK information on the first UL resource, based on the first UE not performing SL transmission on the first SL resource.

Based on an embodiment of the present disclosure, a non-transitory computer-readable storage medium storing instructions may be provided. For example, the instructions, when executed, may cause a base station to: transmit, to a first device, information related to a first sidelink (SL) resource and information related to a first uplink (UL) resource; and receive, from the first device, NACK information on the first UL resource, based on the first device not performing SL transmission on the first SL resource.

Figure 33:
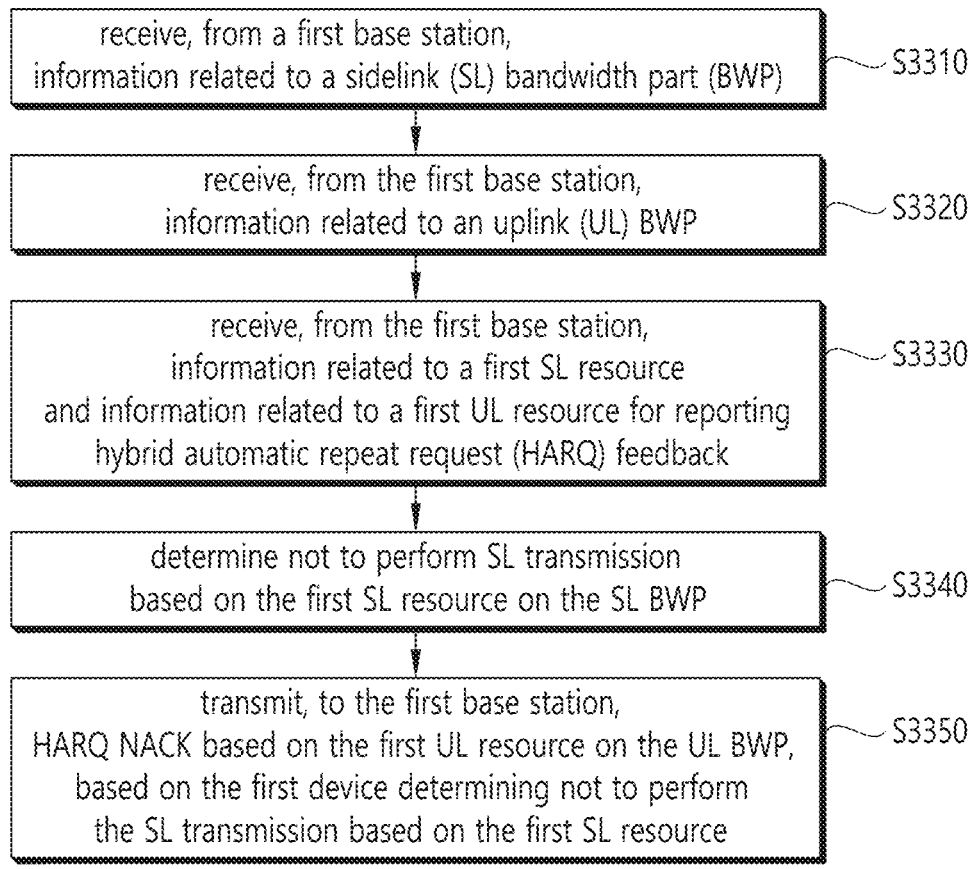
FIG. 33 shows a method for a first device to perform wireless communication, based on an embodiment of the present disclosure.

FIG. 33 shows a method for a first device to perform wireless communication, based on an embodiment of the present disclosure. The embodiment of FIG. 33 may be combined with various embodiments of the present disclosure.

Referring to FIG. 33, in step S3310, the first device may receive, from a first base station, information related to a sidelink (SL) bandwidth part (BWP). In step S3320, the first device may receive, from the first base station, information related to an uplink (UL) BWP. In step S3330, the first device may receive, from the first base station, information related to a first SL resource and information related to a first UL resource for reporting hybrid automatic repeat request (HARQ) feedback. In step S3340, the first device may determine not to perform SL transmission based on the first SL resource on the SL BWP. In step S3350, the first device may transmit, to the first base station, HARQ NACK based on the first UL resource on the UL BWP, based on the first device determining not to perform the SL transmission based on the first SL resource.

For example, the first SL resource and a second SL resource may be overlapped in a time domain, and the first SL resource may be a resource related to NR-based SL transmission, and the second SL resource may be a resource related to evolved universal terrestrial radio access (E-UTRA)-based SL communication. Herein, the first device may determine not to perform the SL transmission based on the first SL resource, based on a priority related to the E-UTRA-based SL communication being higher than a priority related to the NR-based SL transmission. Additionally, for example, the first device may select the second SL resource based on sensing. Additionally, for example, the first device may receive, from a second base station, information related to the second SL resource, and the first base station may be an NR-based base station, and the second base station may be an E-UTRA-based base station.

For example, the first device may determine not to perform the SL transmission based on the first SL resource, based on the first SL resource and a second UL resource being overlapped in a time domain. For example, the first SL resource and a plurality of second UL resources may be overlapped in a time domain, and the first device may determine not to perform the SL transmission based on the first SL resource, based on at least one of a plurality of priorities related to a plurality of UL transmissions on the plurality of second UL resources being higher than a priority related to the SL transmission on the first SL resource.

For example, the first SL resource may be one or more SL resources allocated by a dynamic grant, and the SL transmission may not be performed based on the one or more SL resources, and the first UL resource may be a UL resource related to the one or more SL resources. For example, the first SL resource may be one or more SL resources within one transmission period allocated by a configured grant, and the SL transmission may not be performed based on the one or more SL resources within the one transmission period, and the first UL resource may be a UL resource related to the one or more SL resources within the one transmission period.

For example, the first device may determine whether to perform the SL transmission based on the first SL resource, based on a priority related to the SL transmission on the first SL resource. For example, the information related to the first SL resource and the information related to the first UL resource may be received from the first base station through a downlink control information (DCI) or a radio resource control (RRC) message.

Additionally, for example, the first device may receive, from the first base station through a physical downlink control channel (PDCCH), a downlink control information (DCI) including information related to a third SL resource and information related to a third UL resource, in response to the HARQ NACK. Additionally, for example, the first device may transmit, to a second device, a physical sidelink control channel (PSCCH) and a physical sidelink shared channel (PSSCH) based on the third SL resource. Additionally, for example, the first device may receive, from the second device, hybrid automatic repeat request (HARQ) feedback based on a physical sidelink feedback channel (PSFCH) resource related to the PSSCH. Additionally, for example, the first device may transmit, to the first base station, the HARQ feedback based on the third UL resource.

For example, the SL transmission may include at least one of physical sidelink control channel (PSCCH) transmission and physical sidelink shared channel (PSSCH) transmission, and the first UL resource may include at least one of a physical uplink control channel (PUCCH) resource and a physical uplink shared channel (PUSCH) resource.

Additionally, for example, the first device may generate the HARQ NACK information, based on the first device determining not to perform the SL transmission based on the first SL resource.

The proposed method can be applied to the device(s) described in the present disclosure. First, the processor 102 of the first device 100 may control the transceiver 106 to receive, from a first base station, information related to a sidelink (SL) bandwidth part (BWP). In addition, the processor 102 of the first device 100 may control the transceiver 106 to receive, from the first base station, information related to an uplink (UL) BWP. In addition, the processor 102 of the first device 100 may control the transceiver 106 to receive, from the first base station, information related to a first SL resource and information related to a first UL resource for reporting hybrid automatic repeat request (HARQ) feedback. In addition, the processor 102 of the first device 100 may determine not to perform SL transmission based on the first SL resource on the SL BWP. In addition, the processor 102 of the first device 100 may control the transceiver 106 to transmit, to the first base station, HARQ NACK based on the first UL resource on the UL BWP, based on the first device determining not to perform the SL transmission based on the first SL resource.

Based on an embodiment of the present disclosure, a first device configured to perform wireless communication may be provided. For example, the first device may comprise: one or more memories storing instructions; one or more transceivers; and one or more processors connected to the one or more memories and the one or more transceivers. For example, the one or more processors may execute the instructions to: receive, from a first base station, information related to a sidelink (SL) bandwidth part (BWP); receive, from the first base station, information related to an uplink (UL) BWP; receive, from the first base station, information related to a first SL resource and information related to a first UL resource for reporting hybrid automatic repeat request (HARQ) feedback; determine not to perform SL transmission based on the first SL resource on the SL BWP; and transmit, to the first base station, HARQ NACK based on the first UL resource on the UL BWP, based on the first device determining not to perform the SL transmission based on the first SL resource.

Based on an embodiment of the present disclosure, an apparatus configured to control a first user equipment (UE) performing wireless communication may be provided. For example, the apparatus may comprise: one or more processors; and one or more memories operably connected to the one or more processors and storing instructions. For example, the one or more processors may execute the instructions to: receive, from a first base station, information related to a sidelink (SL) bandwidth part (BWP); receive, from the first base station, information related to an uplink (UL) BWP; receive, from the first base station, information related to a first SL resource and information related to a first UL resource for reporting hybrid automatic repeat request (HARQ) feedback; determine not to perform SL transmission based on the first SL resource on the SL BWP; and transmit, to the first base station, HARQ NACK based on the first UL resource on the UL BWP, based on the first UE determining not to perform the SL transmission based on the first SL resource.

Based on an embodiment of the present disclosure, a non-transitory computer-readable storage medium storing instructions may be provided. For example, the instructions, when executed, may cause a first device to: receive, from a first base station, information related to a sidelink (SL) bandwidth part (BWP); receive, from the first base station, information related to an uplink (UL) BWP; receive, from the first base station, information related to a first SL resource and information related to a first UL resource for reporting hybrid automatic repeat request (HARQ) feedback; determine not to perform SL transmission based on the first SL resource on the SL BWP; and transmit, to the first base station, HARQ NACK based on the first UL resource on the UL BWP, based on the first device determining not to perform the SL transmission based on the first SL resource.

Figure 34:
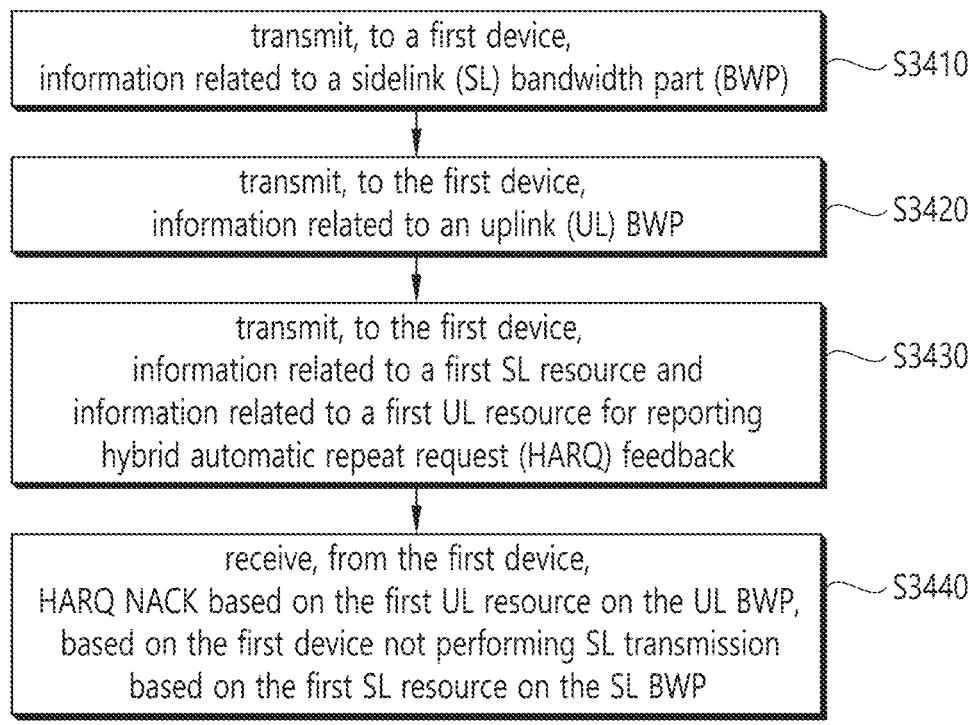
FIG. 34 shows a method for a base station to perform wireless communication, based on an embodiment of the present disclosure.

FIG. 34 shows a method for a base station to perform wireless communication, based on an embodiment of the present disclosure. The embodiment of FIG. 34 may be combined with various embodiments of the present disclosure.

Referring to FIG. 34, in step S3410, the base station may transmit, to a first device, information related to a sidelink (SL) bandwidth part (BWP). In step S3420, the base station may transmit, to the first device, information related to an uplink (UL) BWP. In step S3430, the base station may transmit, to the first device, information related to a first SL resource and information related to a first UL resource for reporting hybrid automatic repeat request (HARQ) feedback. In step S3440, the base station may receive, from the first device, HARQ NACK based on the first UL resource on the UL BWP, based on the first device not performing SL transmission based on the first SL resource on the SL BWP.

The proposed method can be applied to the device(s) described in the present disclosure. First, the processor 202 of the base station 200 may control the transceiver 206 to transmit, to a first device, information related to a sidelink (SL) bandwidth part (BWP). In addition, the processor 202 of the base station 200 may control the transceiver 206 to transmit, to the first device, information related to an uplink (UL) BWP. In addition, the processor 202 of the base station 200 may control the transceiver 206 to transmit, to the first device, information related to a first SL resource and information related to a first UL resource for reporting hybrid automatic repeat request (HARQ) feedback. In addition, the processor 202 of the base station 200 may control the transceiver 206 to receive, from the first device, HARQ NACK based on the first UL resource on the UL BWP, based on the first device not performing SL transmission based on the first SL resource on the SL BWP.

Based on an embodiment of the present disclosure, a base station configured to perform wireless communication may be provided. For example, the base station may comprise: one or more memories storing instructions; one or more transceivers; and one or more processors connected to the one or more memories and the one or more transceivers. For example, the one or more processors may execute the instructions to: transmit, to a first device, information related to a sidelink (SL) bandwidth part (BWP); transmit, to the first device, information related to an uplink (UL) BWP;

transmit, to the first device, information related to a first SL resource and information related to a first UL resource for reporting hybrid automatic repeat request (HARQ) feedback; and receive, from the first device, HARQ NACK based on the first UL resource on the UL BWP, based on the first device not performing SL transmission based on the first SL resource on the SL BWP.

Based on an embodiment of the present disclosure, an apparatus configured to control a base station performing wireless communication may be provided. For example, the apparatus may comprise: one or more processors; and one or more memories operably connected to the one or more processors and storing instructions. For example, the one or more processors may execute the instructions to: transmit, to a first user equipment (UE), information related to a sidelink (SL) bandwidth part (BWP); transmit, to the first UE, information related to an uplink (UL) BWP; transmit, to the first UE, information related to a first SL resource and information related to a first UL resource for reporting hybrid automatic repeat request (HARQ) feedback; and receive, from the first UE, HARQ NACK based on the first UL resource on the UL BWP, based on the first UE not performing SL transmission based on the first SL resource on the SL BWP.

Based on an embodiment of the present disclosure, a non-transitory computer-readable storage medium storing instructions may be provided. For example, the instructions, when executed, may cause a base station to: transmit, to a first device, information related to a sidelink (SL) bandwidth part (BWP); transmit, to the first device, information related to an uplink (UL) BWP; transmit, to the first device, information related to a first SL resource and information related to a first UL resource for reporting hybrid automatic repeat request (HARQ) feedback; and receive, from the first device, HARQ NACK based on the first UL resource on the UL BWP, based on the first device not performing SL transmission based on the first SL resource on the SL BWP.

Various embodiments of the present disclosure may be combined with each other.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. A method for performing wireless communication by a first device, the method comprising:
   receiving, from a first base station, information related to a sidelink (SL) bandwidth part (BWP);
   receiving, from the first base station, information related to an uplink (UL) BWP;
   receiving, from the first base station, information related to a first SL resource and information related to a first UL resource for reporting hybrid automatic repeat request (HARQ) feedback;
   determining not to perform SL transmission on the first SL resource on the SL BWP, based on the first SL resource and a second UL resource being overlapped in a time domain, or based on (i) the first SL resource related to NR-based SL transmission and a second SL resource related to evolved universal terrestrial radio access (E-UTRA)-based SL communication being overlapped in a time domain and (ii) a priority related to the E-UTRA-based SL communication being higher than a priority related to the NR-based SL transmission; and
   transmitting, to the first base station, HARQ NACK based on the first UL resource on the UL BWP, based on the first device determining not to perform the SL transmission on the first SL resource.

2. The method of claim 1, further comprising:
   selecting the second SL resource based on sensing.

3. The method of claim 1, further comprising:
   receiving, from a second base station, information related to the second SL resource,
   wherein the first base station is an NR-based base station, and
   wherein the second base station is an E-UTRA-based base station.

4. The method of claim 1, wherein the first SL resource and a plurality of second UL resources are overlapped in a time domain, and
   wherein the first device determines not to perform the SL transmission based on the first SL resource, based on at least one of a plurality of priorities related to a plurality of UL transmissions on the plurality of second UL resources being higher than a priority related to the SL transmission on the first SL resource.

5. The method of claim 1, wherein the first SL resource is one or more SL resources allocated by a dynamic grant,
   wherein the SL transmission is not performed based on the one or more SL resources, and
   wherein the first UL resource is a UL resource related to the one or more SL resources.

6. The method of claim 1, wherein the first SL resource is one or more SL resources within one transmission period allocated by a configured grant,
   wherein the SL transmission is not performed based on the one or more SL resources within the one transmission period, and
   wherein the first UL resource is a UL resource related to the one or more SL resources within the one transmission period.

7. The method of claim 1, wherein the first device determines whether to perform the SL transmission based on the first SL resource, based on a priority related to the SL transmission on the first SL resource.

8. The method of claim 1, wherein the information related to the first SL resource and the information related to the first UL resource are received from the first base station through a downlink control information (DCI) or a radio resource control (RRC) message.

9. The method of claim 1, further comprising:
   receiving, from the first base station through a physical downlink control channel (PDCCH), a downlink control information (DCI) including information related to a third SL resource and information related to a third UL resource, in response to the HARQ NACK;
   transmitting, to a second device, a physical sidelink control channel (PSCCH) and a physical sidelink shared channel (PSSCH) based on the third SL resource;
   receiving, from the second device, hybrid automatic repeat request (HARQ) feedback based on a physical sidelink feedback channel (PSFCH) resource related to the PSSCH; and
   transmitting, to the first base station, the HARQ feedback based on the third UL resource.

10. The method of claim 1, wherein the SL transmission includes at least one of physical sidelink control channel (PSCCH) transmission and physical sidelink shared channel (PSSCH) transmission, and wherein the first UL resource includes at least one of a physical uplink control channel (PUCCH) resource and a physical uplink shared channel (PUSCH) resource.

11. The method of claim 1, further comprising:

generating the HARQ NACK information, based on the first device determining not to perform the SL transmission based on the first SL resource.

12. A first device configured to perform wireless communication, the first device comprising:

one or more processors;

one or more transceivers; and one or more memories connected to the one or more processors and storing instructions that, based on being executed, cause the one or more processors to perform operations comprising:

receiving, from a first base station, information related to a sidelink (SL) bandwidth part (BWP);

receiving, from the first base station, information related to an uplink (UL) BWP;

receiving, from the first base station, information related to a first SL resource and information related to a first UL resource for reporting hybrid automatic repeat request (HARQ) feedback;

determining not to perform SL transmission on the first SL resource on the SL BWP, based on the first SL resource and a second UL resource being overlapped in a time domain, or based on (i) the first SL resource related to NR-based SL transmission and a second SL resource related to evolved universal terrestrial radio access (E-UTRA)-based SL communication being overlapped in a time domain and (ii) a priority related to the E-UTRA-based SL communication being higher than a priority related to the NR-based SL transmission; and transmitting, to the first base station, HARQ NACK on the first UL resource on the UL BWP, based on the first device determining not to perform the SL transmission on the first SL resource.

13. An apparatus configured to control a first user equipment (UE) performing wireless communication, the apparatus comprising:

one or more processors; and one or more memories operatively coupled to the one or more processors and storing instructions that, when executed, cause the one or more processors to perform operations comprising:

receiving, information related to a sidelink (SL) bandwidth part (BWP), from a first base station;

receiving, information related to an uplink (UL) BWP, from the first base station;

receiving, information related to a first SL resource and information related to a first UL resource for reporting hybrid automatic repeat request (HARQ) feedback, from the first base station;

based on the first SL resource and a second UL resource being overlapped in a time domain, or based on (i) the first SL resource related to NR-based SL transmission and a second SL resource related to evolved universal terrestrial radio access (E-UTRA)-based SL communication overlap in a time domain and (ii) a priority related to the E-UTRA-based SL communication is higher than a priority related to the NR-based SL transmission; and wherein the operations further comprise:

determining not to perform the SL transmission on the first SL resource on the SL BWP, and transmitting, HARQ NACK, to the first base station, based on the first UL resource on the UL BWP.

* * * * *